US012583105B2

(12) United States Patent
Fukuda et al.

(10) Patent No.: US 12,583,105 B2
(45) Date of Patent: Mar. 24, 2026

(54) ROBOT, CONTROL METHOD THEREFOR, METHOD FOR MANUFACTURING ARTICLE USING ROBOT, AND STORAGE MEDIUM

(71) Applicant: CANON KABUSHIKI KAISHA, Tokyo (JP)

(72) Inventors: Junichi Fukuda, Kanagawa (JP); Yohji Nakajima, Tokyo (JP); Masaru Ogata, Tokyo (JP); Hidetada Asano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 634 days.

(21) Appl. No.: 18/048,802

(22) Filed: Oct. 21, 2022

(65) Prior Publication Data

US 2023/0136568 A1     May 4, 2023

(30) Foreign Application Priority Data

Oct. 29, 2021     (JP) ................................. 2021-177909
Dec. 6, 2021     (JP) ................................. 2021-198021

(51) Int. Cl.
*B25J 9/16*          (2006.01)

(52) U.S. Cl.
CPC .................................. *B25J 9/1633* (2013.01)

(58) Field of Classification Search
CPC ... B25J 9/1633; B25J 9/162; B25J 9/10; B25J 9/06; B25J 9/0009; B25J 9/101; B62D 57/032
USPC .................. 74/490.05, 490.06; 901/1, 15, 21
See application file for complete search history.

(56) References Cited

U.S. PATENT DOCUMENTS

| | | | | |
|---|---|---|---|---|
| 11,890,756 | B2 * | 2/2024 | Liu .......................... | B25J 9/101 |
| 2007/0089963 | A1 * | 4/2007 | Kinoshita ................ | B25J 9/101 |
| | | | | 29/407.01 |
| 2008/0161829 | A1 * | 7/2008 | Kang ..................... | B25J 9/0042 |
| | | | | 606/130 |
| 2010/0178101 | A1 | 7/2010 | Day | |
| 2018/0009104 | A1 * | 1/2018 | Vance ...................... | B25J 9/101 |
| 2019/0291266 | A1 * | 9/2019 | Fujioka ................... | B25J 17/00 |
| 2019/0366537 | A1 * | 12/2019 | Nakajima ............. | F16H 19/005 |

FOREIGN PATENT DOCUMENTS

| | | | | |
|---|---|---|---|---|
| CN | 1171998 | A | * 2/1998 | .............. G05G 5/04 |
| CN | 108136603 | A | 6/2018 | |
| CN | 109689308 | A | 4/2019 | |
| CN | 110549373 | A | 12/2019 | |
| CN | 111319061 | A | 6/2020 | |
| JP | S62255092 | A | 11/1987 | |
| JP | H0230486 | A | 1/1990 | |
| JP | H05228882 | A | 9/1993 | |
| JP | H10329081 | A | 12/1998 | |

(Continued)

*Primary Examiner* — T. Scott Fix
(74) *Attorney, Agent, or Firm* — Canon U.S.A., Inc., IP Division

(57)          ABSTRACT

A robot includes a first link, a driving device configured to cause the first link to rotate, a transmission member configured to transmit a rotation of the driving device, a first stopper provided on the first link, and a second stopper provided on the transmission member, wherein the first stopper and the second stopper are brought into contact with each other by a relative movement between the first link and the transmission member.

23 Claims, 18 Drawing Sheets

(56) References Cited

FOREIGN PATENT DOCUMENTS

| | | | |
|----|----------|---|---------|
| JP | H11123690 | A | 5/1999 |
| JP | 2006218573 | A | 8/2006 |
| JP | 2011072186 | A | 4/2011 |
| JP | 2018146499 | A | 9/2018 |
| JP | 2019166579 | A | 10/2019 |
| JP | 2019174325 | A | 10/2019 |

* cited by examiner

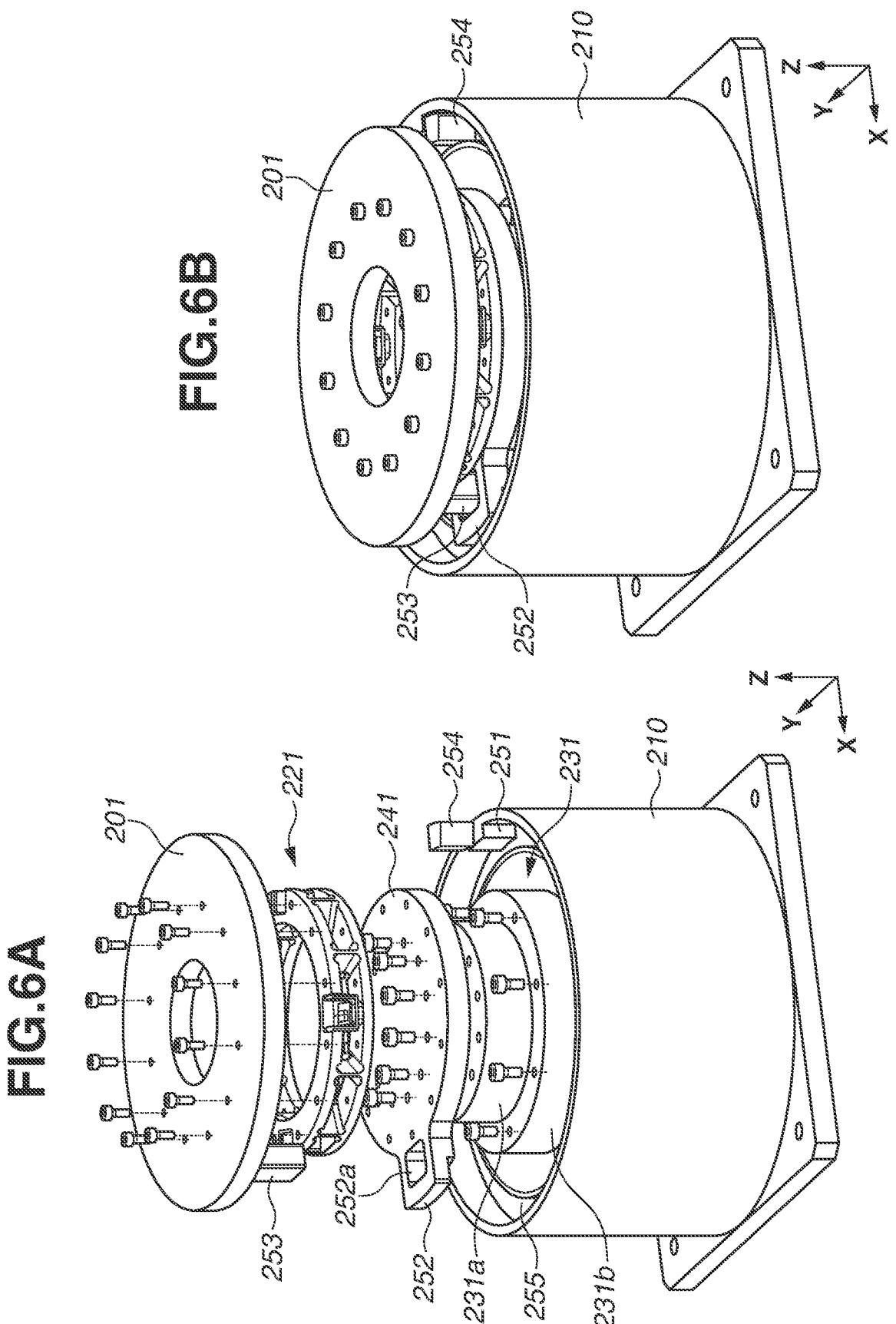

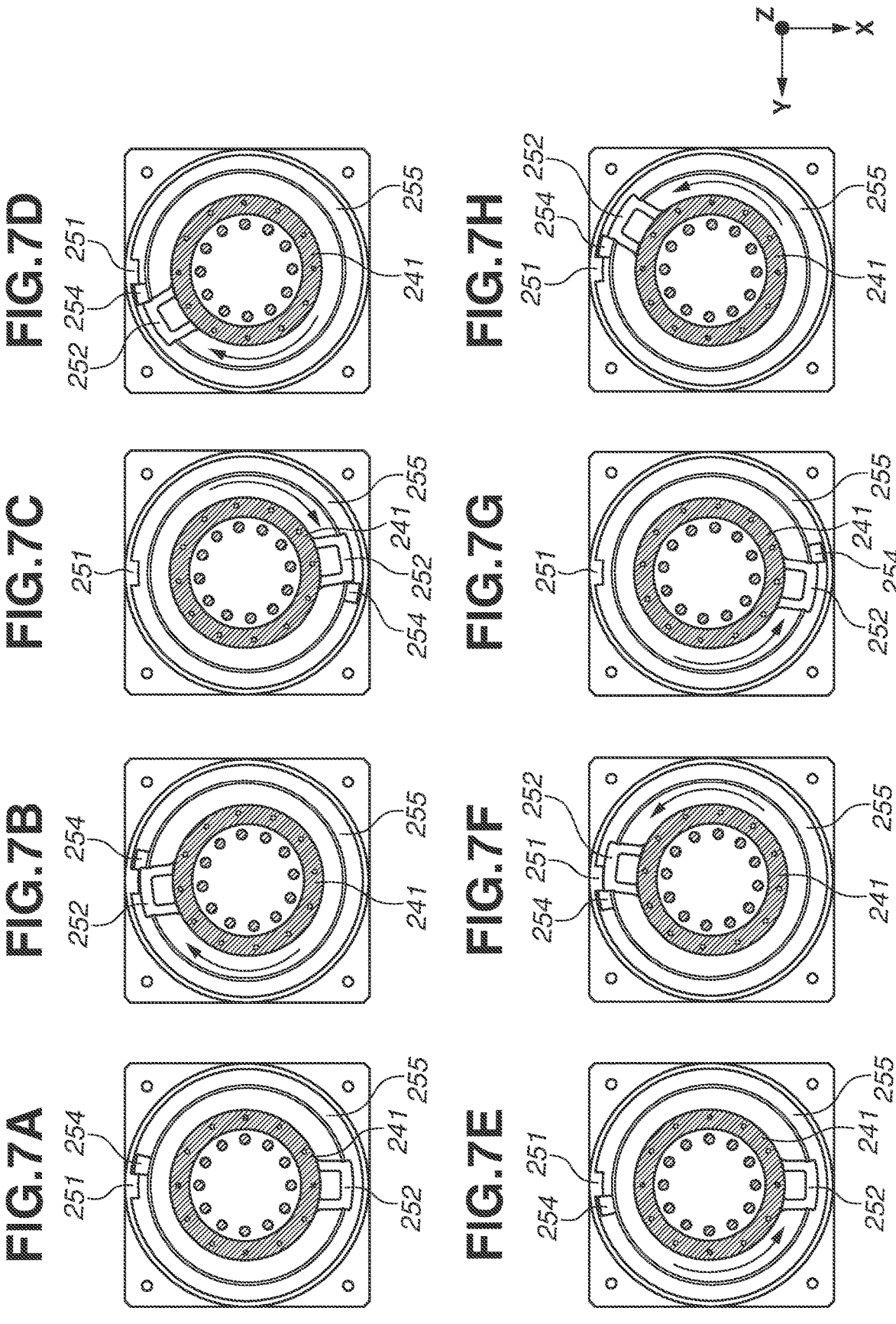

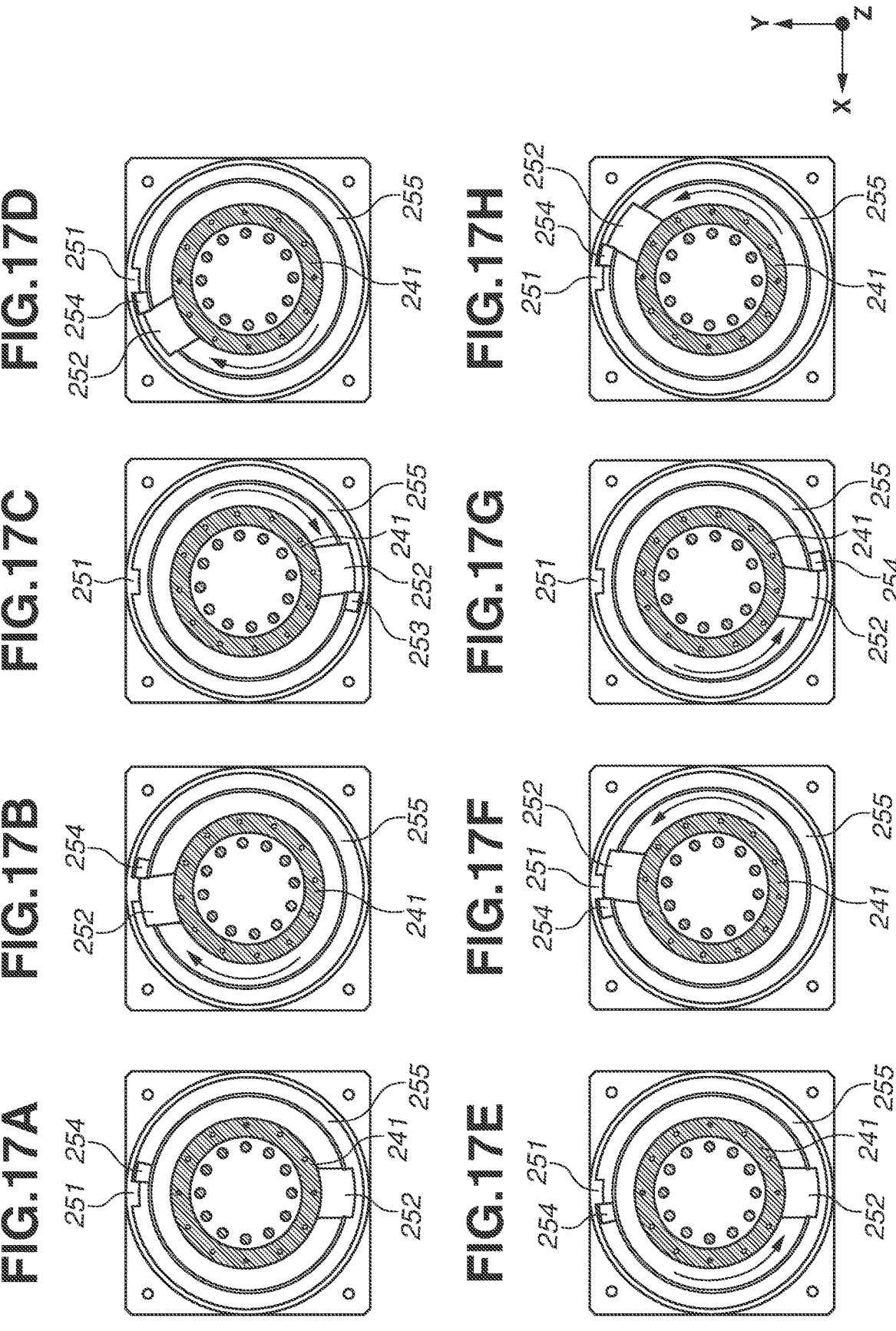

ROBOT, CONTROL METHOD THEREFOR, METHOD FOR MANUFACTURING ARTICLE USING ROBOT, AND STORAGE MEDIUM

BACKGROUND

Field of the Disclosure

The present disclosure relates to a robot.

Description of the Related Art

A robot that includes links that operate in combination with joints and has a configuration in which a sensor for acquiring information about a force applied to each link is located in each link to perform control processing based on the force information has recently attracted attention. In particular, a torque sensor for acquiring torque information as force information is located in each link, thereby facilitating control of a force generated in each link of the robot and control of a load or force applied to each part by an end effector located at a tip end of the robot. However, if the robot erroneously operates in an unintended direction during execution of work using a robot or during execution of robot teaching work, the robot can collide with a peripheral apparatus and the robot and the peripheral apparatus can be damaged. To address such an issue, Japanese Patent Application Laid-Open No. 2019-166579 discusses a technique in which a stopper for mechanically limiting a movable range of each joint of a robot is located in each joint, and the position of the stopper is arbitrarily changed to limit the movable range of each joint. This configuration contributes to reducing the risk of colliding with a peripheral apparatus and damaging the robot and the peripheral apparatus even in a case where the robot erroneously operates in an unintended direction.

SUMMARY

According to an aspect of the present disclosure, a robot includes a first link, a driving device configured to cause the first link to rotate, a transmission member configured to transmit a rotation of the driving device, a first stopper provided on the first link, and a second stopper provided on the transmission member, wherein the first stopper and the second stopper are brought into contact with each other by a relative movement between the first link and the transmission member.

Further features of the present disclosure will become apparent from the following description of exemplary embodiments with reference to the attached drawings.

BRIEF DESCRIPTION OF THE DRAWINGS

FIGS. 6A and 6B are an exploded view and an assembled view, respectively, illustrating a detailed connection relationship between the link and the base according to a modified example of the first exemplary embodiment.

FIGS. 7A to 7H each illustrate an operation of a stopper and a movable component according to the modified example of the first exemplary embodiment.

FIGS. 16A and 16B are an exploded view and an assembled view, respectively, illustrating a detailed connection relationship between the link and the base according to a seventh exemplary embodiment.

FIGS. 17A to 17H each illustrate an operation of the stopper and the movable component according to the seventh exemplary embodiment.

DESCRIPTION OF THE EMBODIMENTS

In the technique discussed in Japanese Patent Application Laid-Open No. 2019-166579, a driving force of a robot arm (link) cannot be sufficiently decreased by a stopper that comes into contact with the robot arm (link), depending on the magnitude of an impact force generated when the robot arm (link) and the stopper collide with each other. In particular, a sensor for detecting a force, such as a torque sensor, is configured to be deformable to some extent so that the sensor can detect the force. Therefore, if the impact force that has not been sufficiently decreased is transmitted to the sensor for detecting a force such as the torque sensor that is provided in the robot arm (link), the torque sensor can be deformed beyond an allowable deformation range and can be damaged.

In view of the above-described issues, aspects of the present disclosure provides for reducing the risk of damaging a sensor for detecting a force when a robot is stopped by a mechanical stopper.

Exemplary embodiments of the present disclosure will be described below with reference to examples illustrated in the accompanying drawings.

The following exemplary embodiments are merely examples. For example, detailed configurations can be appropriately changed by a person skilled in the art without departing from the scope of the present disclosure. Numerical values given in the exemplary embodiments are numerical values for reference, and are not numerical values that limit the present disclosure. In the accompanying drawings, arrows X, Y, and Z indicate the entire coordinate system of a robot system. In general, an XYZ three-dimensional coordinate system indicates the world coordinate system of the entire installation environment. Additionally, local coordinate systems may be used, as needed, to indicate a position of a robot hand, a finger portion, a joint, and the like, depending on control processing and the like.

Figure 1:
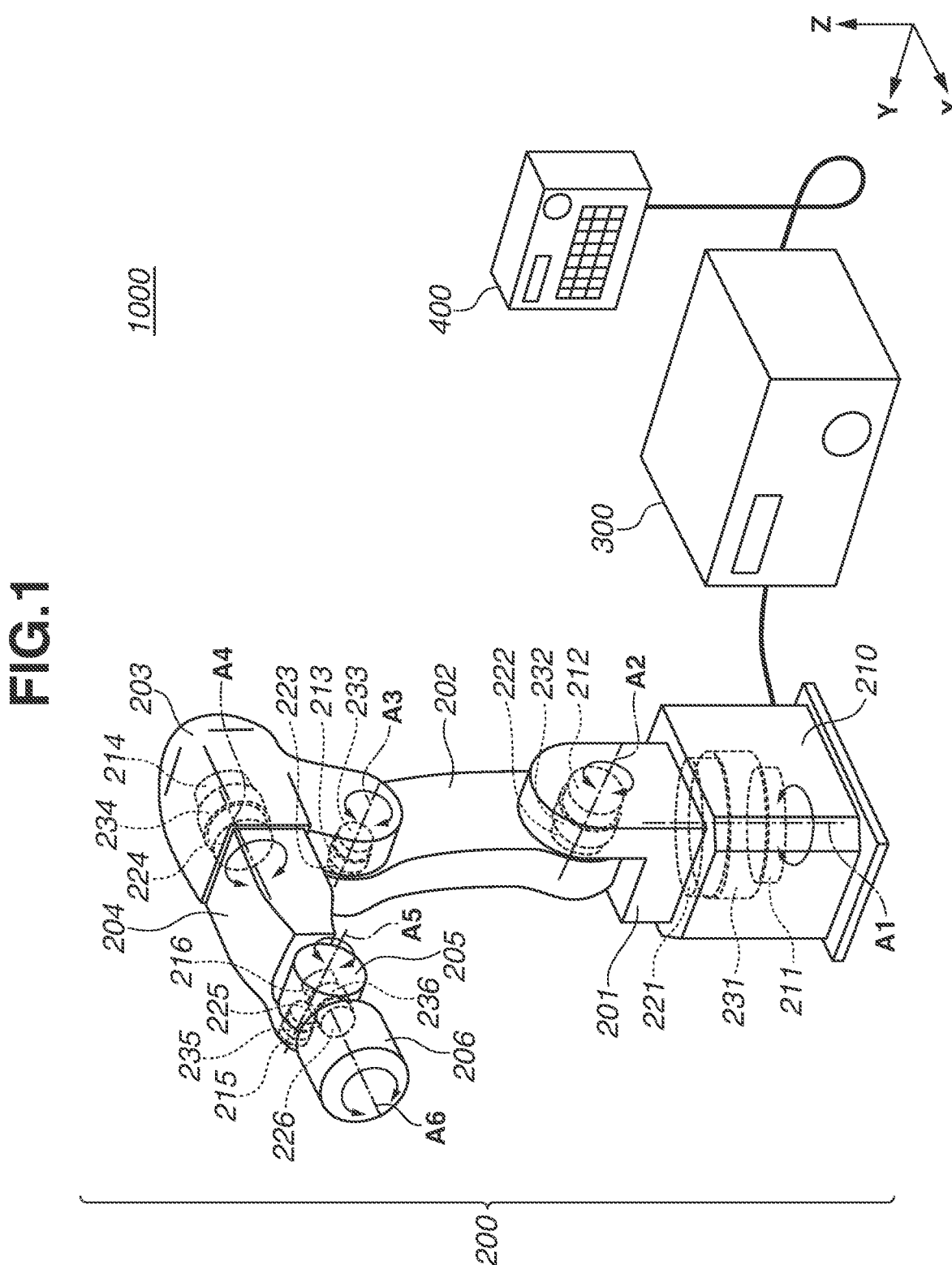
FIG. 1 illustrates a schematic configuration of a robot system according to a first exemplary embodiment.

FIG. 1 illustrates a schematic configuration of a robot system 1000 according to a first exemplary embodiment. As illustrated in FIG. 1, the robot system 1000 includes a robot arm body 200 configured as an articulated robot, a control device 300 that controls the robot arm body 200, and an external input device 400.

The robot arm body 200 according to the present exemplary embodiment is a six-axis articulated arm. The robot arm body 200 includes a base 210 and six links 201 to 206. The links 201 to 206 are rotationally driven about joint axes A1 to A6 by six driving devices 231 to 236, respectively, in a direction indicated by each arrow in FIG. 1. The driving devices 231 to 236 each include a motor and a decelerator that decelerates an output from the motor. In the present exemplary embodiment, a wave gear reducer is used. In other words, the respective motors provided in the driving devices 231 to 236 function as drive sources that generate a driving force for causing the links 201 to 206 coupled with the joints to be displaced relative to each other.

The motors incorporate encoders 211 to 216, respectively, to detect a rotation angle of the corresponding motor.

Torque sensors 221 to 226, which are sensors for detecting force information, are provided between output ends of the driving devices 231 to 236 and the links 201 to 206 that rotate with the output ends, respectively. The torque sensors 221 to 226 each include a structure to be described below and an optical encoder for detecting a relative movement amount of the structure. During driving of each joint of the robot arm body 200, the relative movement amount of the structures of the torque sensors 221 to 226 in association with a relative displacement of the links of the robot arm body 200 is detected by the optical encoder.

As illustrated in FIG. 1, the link 201 of the robot arm body 200 is connected to the base 210 with a bearing (not illustrated) so that the link 201 can be rotated with the torque sensor 221 by the driving device 231 illustrated in FIG. 1. The driving device 231 has a movable range in a direction indicated by the arrow from the initial orientation. The link 202 of the robot arm body 200 is connected to the link 201 with a bearing (not illustrated) so that the link 202 can be rotated with the torque sensor 222 by the driving device 232 illustrated in FIG. 1. The driving device 232 has a movable range in the arrow direction from the original orientation.

The link 203 of the robot arm body 200 is connected to the link 202 with a bearing (not illustrated) so that the link 203 can be rotated with the torque sensor 223 by the driving device 233 illustrated in FIG. 1. The driving device 233 has a movable range in the arrow direction from the original orientation. The link 204 of the robot arm body 200 is connected to the link 203 with a bearing (not illustrated) so that the link 204 can be rotated with the torque sensor 224 by the driving device 234 illustrated in FIG. 1. The driving device 234 has a movable range in the arrow direction from the original orientation.

The link 205 of the robot arm body 200 is connected to the link 204 with a bearing (not illustrated) so that the link 205 can be rotated with the torque sensor 225 by the driving device 235 illustrated in FIG. 1. The driving device 235 has a movable range in the arrow direction from the original orientation. The link 206 of the robot arm body 200 is connected to the link 205 with a bearing (not illustrated) so that the link 206 can be rotated with the torque sensor 226 by the driving device 236 illustrated in FIG. 1. The driving device 236 has a movable range in the arrow direction from the original orientation.

A tip end of the link 206 of the robot arm body 200 is connected with an end effector body, such as a (electrically driven) hand or (pneumatically driven) air hand, which is used for assembly work or transfer work in a production line. This end effector body can be mounted using a (semi) fixing unit (not illustrated) such as screwing on the link 206, or can be mounted using an attachment/detachment unit (not illustrated) such as latching (ratcheting). In particular, in a case where the end effector body is detachably mounted, a method is conceivable in which the end effector body located at a supply position (not illustrated) is detached or replaced by an operation of the robot arm body 200 itself by controlling the robot arm body 200.

In the present exemplary embodiment, an end of the robot arm body 200 corresponds to the link 206 and/or the end effector body. When the end effector body is gripping an object, the end effector body and the object (e.g., a part or a tool) being gripped by the end effector body are referred to as the end of the robot arm body 200. In other words, the end of the robot arm body 200 corresponds to the link 206 and/or the end effector body, regardless of whether the end effector body is gripping an object.

The external input device 400 is provided with an operation unit including an operation key used to, for example, change the orientation (position or angle) of each joint of the robot arm body 200 or to move the end of the robot arm body 200. When any operation is performed on the operation unit of the external input device 400, the control device 300 transmits signals to the driving devices 231 to 236 for the respective joints depending on the operation of the external input device 400, to control the operation of the robot arm body 200. In this case, the control device 300 executes robot control programs, including control programs to be described below to control each unit of the robot arm body 200.

The above-described configuration enables the robot arm body 200 to cause the link 206 and/or the end effector body to operate to any position and perform a desired operation. For example, a predetermined workpiece and another workpiece can be used as materials and the predetermined workpiece and the other workpiece can be assembled to manufacture an assembly workpiece as a product. In such a manner, an article can be manufactured using the robot arm body 200. While the present exemplary embodiment illustrates an example where an article is manufactured by assembling workpieces using the robot arm body 200, the present disclosure is not limited to this example. For example, an article may be manufactured by processing workpieces using a tool provided on the robot arm body 200, such as a cutting tool or a polishing tool.

Figure 2:
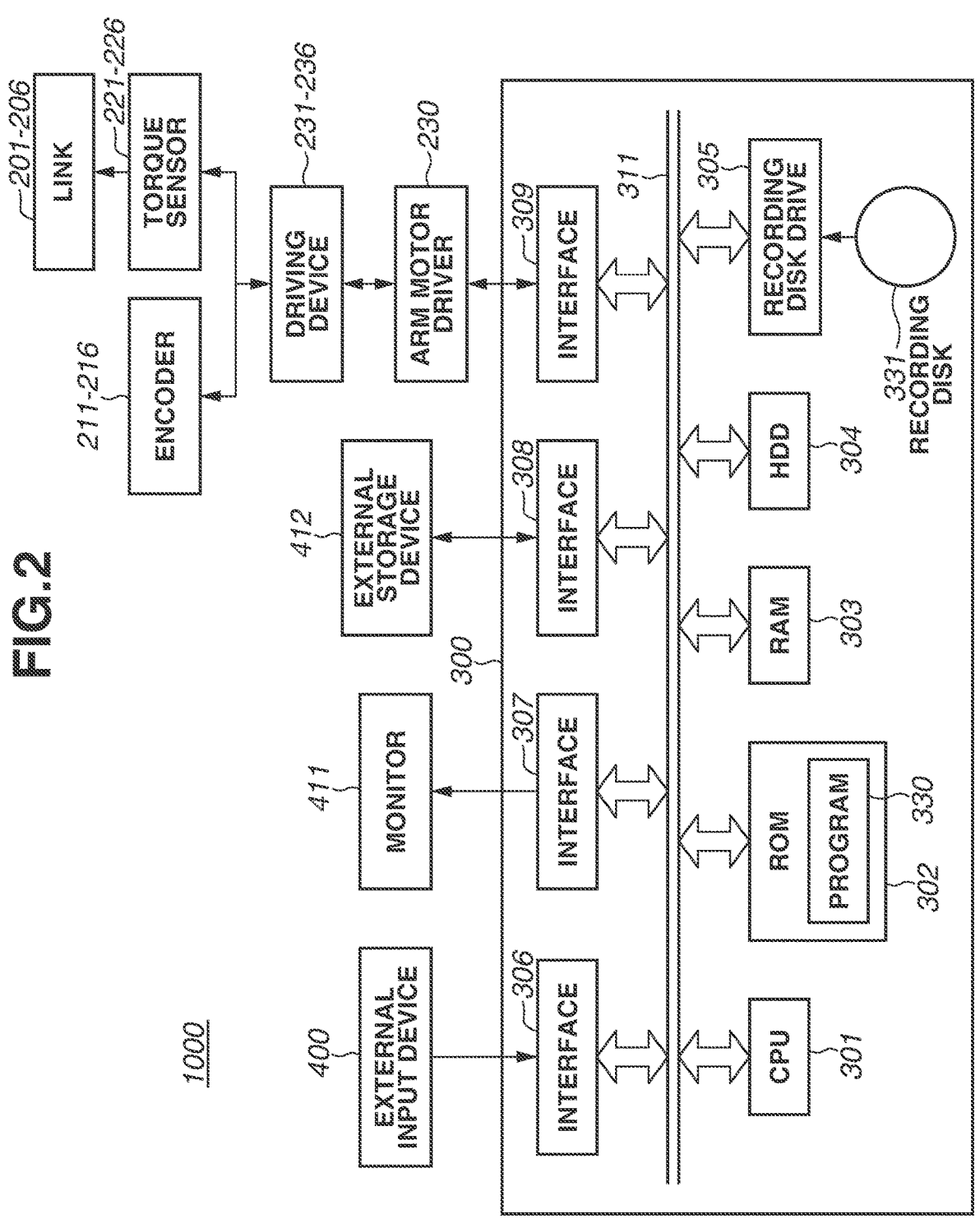
FIG. 2 is a control block diagram illustrating the robot system according to the first exemplary embodiment.

FIG. 2 is a block diagram illustrating a detailed configuration of a control system of the robot system 1000 illustrated in FIG. 1. The control device 300 is composed of a computer and includes a central processing unit (CPU) 301 as a processor. The control device 300 also includes, as a storage unit, a read-only memory (ROM) 302, a random access memory (RAM) 303, a hard disc drive (HDD) 304, and a recording disk drive 305. The control device 300 also includes interfaces 306, 307, 308, and 309, and a bus 311 to establish communication with each apparatus. The CPU 301, the ROM 302, the RAM 303, and the interfaces 306 to 309 are communicably connected with each other via the bus 311.

The RAM 303 is used to temporarily store data such as teaching points and control commands input based on an operation of the external input device 400. The ROM 302 stores a basic program 330 such as a basis input/output system (BIOS) that is used to cause the CPU 301 to execute various arithmetic processing. The CPU 301 executes various arithmetic processing based on control programs recorded (stored) on the HDD 304. The HDD 304 is a storage unit that stores various data such as the results of arithmetic processing performed by the CPU 301. The recording disk drive 305 can read out various data, control programs, and the like recorded on a recording disk 331. The interfaces 307 and 308 are connected with a monitor 411 on which various images are displayed and an external storage device 412 such as a rewritable non-volatile memory or an external HDD.

The external input device 400 can be, for example, an operation device such as a teaching pendant (TP), but instead may be another computer apparatus (a personal computer (PC) or a server) configured to edit a robot program. The external input device 400 can be connected to the control device 300 via a wired or wireless communication connection unit, and includes user interface functions for robot operation, status display, and the like. A target joint angle of each joint that is input from the external input device 400 is output to the CPU 301 via the interface 306 and the bus 311.

The CPU 301 receives, for example, teaching point data input by the external input device 400 from the interface 306. Further, the CPU 301 can generate a trajectory of each axis of the robot arm body 200 based on the teaching point data input from the external input device 400, and can transmit the generated trajectories to the driving devices 231 to 236 using an arm motor driver 230 via the interface 309. The CPU 301 outputs drive command data indicating the control amount of the rotation angle of the motor in each of the driving devices 231 to 236 to the arm motor driver 230 via the bus 311 and the interface 309 at predetermined intervals.

The arm motor driver 230 calculates the amount of current to be output to the motor in each of the driving devices 231 to 236 based on the drive command received from the CPU 301, and supplies a current to each motor to control the joint angle of each joint. Detected signals from the encoders 211 to 216 and the torque sensors 221 to 226 are output to the CPU 301 via the interface 309 and the bus 311. Specifically, the CPU 301 executes feedback control of the motor in each of the driving devices 231 to 236 so that the current value of the joint angle of each joint detected by the encoders 211 to 216 can be set to a target joint angle value via the arm motor driver 230. Similarly, the CPU 301 executes feedback control of each motor so that the current value of torque of each joint detected by the torque sensors 221 to 226 can be set to a target torque value. While a single arm motor driver 230 is used in the present exemplary embodiment, the driving devices 231 to 236 may be provided with respective arm motor drivers 230.

Torque applied to each of the links 201 to 206 during a drive operation can be controlled by returning the output from the torque sensors 221 to 226 to the control device 300 and feeding back the output in driving of the driving devices 231 to 236. Further, a force generated in the link 206 of the robot arm body 200 can be acquired by calculation based on detected values from the torque sensors 221 to 226, and feedback control of a load applied to parts to be assembled can be performed.

In the case of using a robot hand body as the end effector body (not illustrated), the control device 300 may also be connected to a hand motor (not illustrated) via an interface and a hand motor driver. The hand motor driver calculates the amount of current to be output to the hand motor based on a drive command received from the CPU 301, and supplies a current to the hand motor to control the speed of the hand motor. Further, a pulse signal from an encoder of the hand motor is output to the CPU 301 via the interface and the bus 311. Specifically, the CPU 301 executes feedback control of the hand motor via the hand motor driver so that the current value of the speed of the hand motor detected by the encoder is set to a target speed value.

Figure 3:
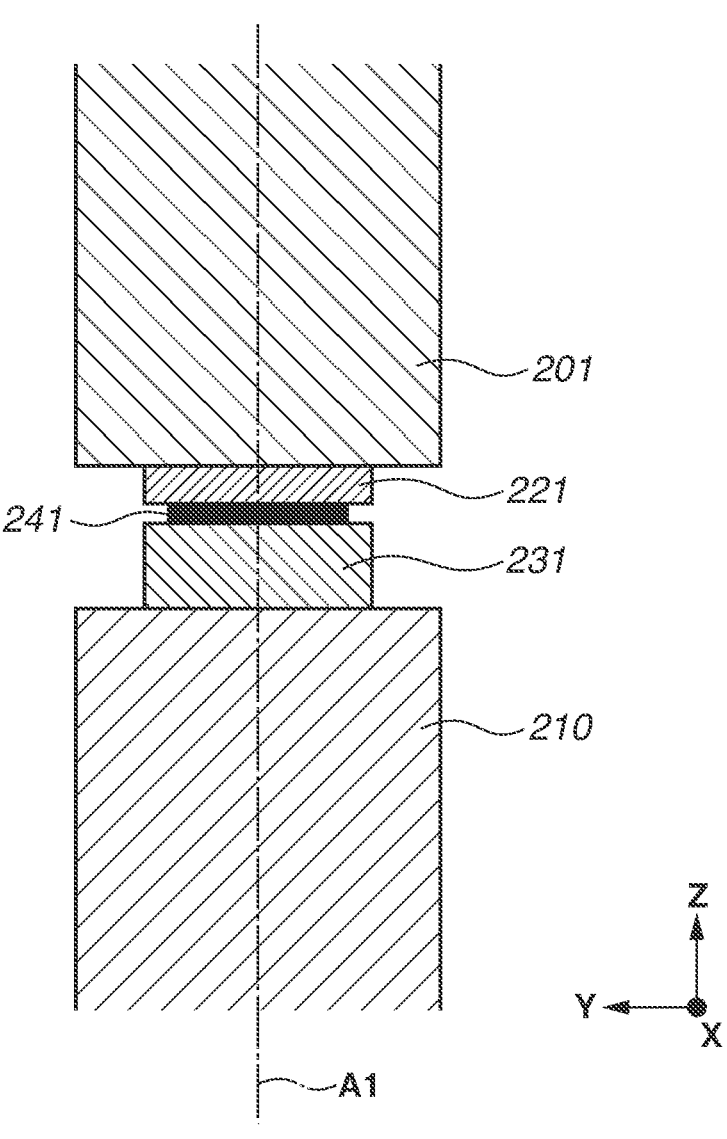
FIG. 3 is a schematic view illustrating a link and a base according to the first exemplary embodiment.

FIG. 3 schematically illustrates a connection relationship between the base 210 and the link 201 of the robot arm body 200. To simplify the description, the connection relationship between the base 210 and the link 201 is described as an example. However, the other joints also have a similar connection relationship. As illustrated in FIG. 3, the driving device 231 is provided on the base 210 and enables the link 201 to rotate about the axis A1. The driving device 231 is fastened to the base 210.

A drive flange 241 is located between an output shaft of the decelerator of the driving device 231 and the torque sensor 221 located on the link 201. The drive flange 241 operates as a transmission member that transmits an operation from the output shaft of the decelerator to the link 201. One end of the torque sensor 221 is fastened to the drive flange 241, and the other end of the torque sensor 221 is fastened to the link 201. The torque sensor 221 includes a structure to be described below and an optical encoder for detecting a relative movement amount of the structure. When the link 201 is driven by the driving device 231, the relative movement amount of the structure of the torque sensor 221 in association with a relative displacement between the drive flange 241 and the link 201 is detected by the optical encoder, and torque is detected based on the relative movement amount.

Figure 4:
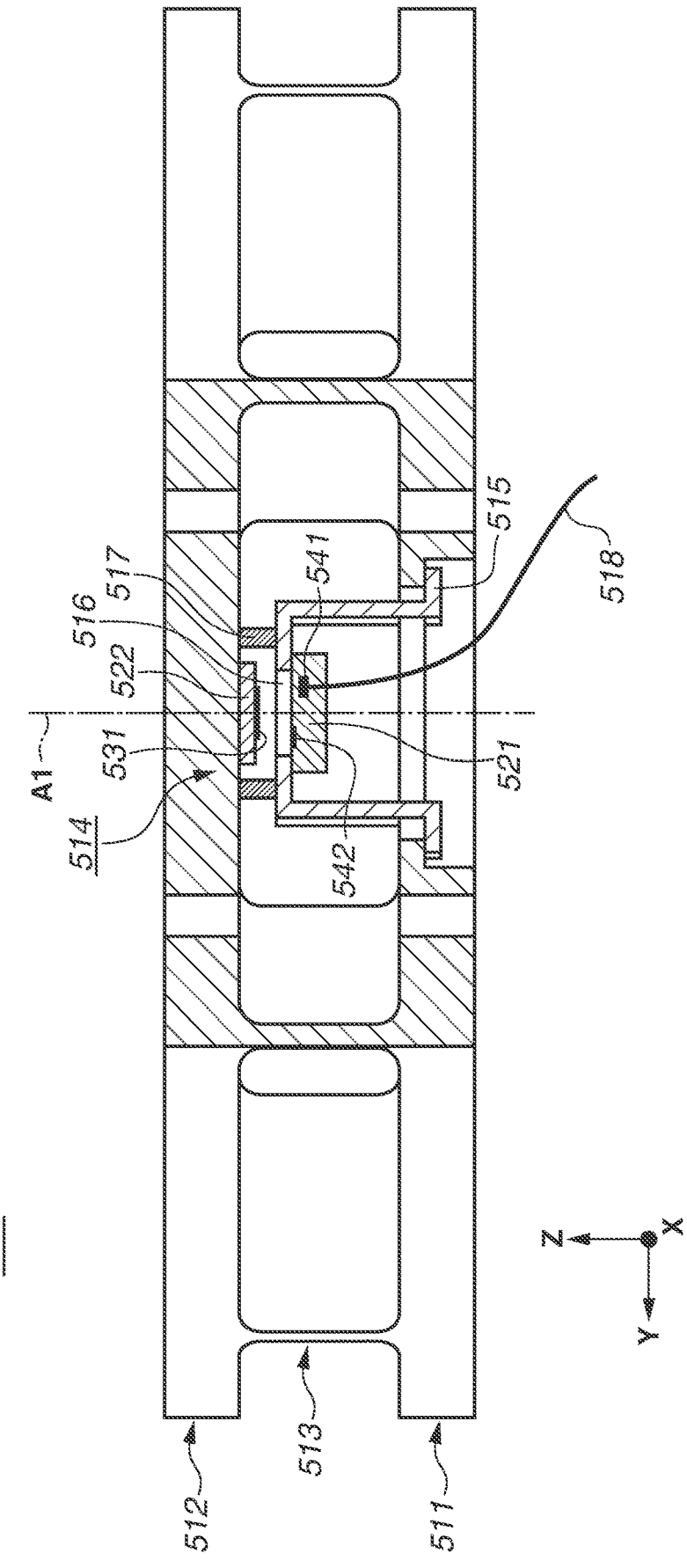
FIG. 4 is a sectional view of a torque sensor according to the first exemplary embodiment.

FIG. 4 is a sectional view of the torque sensor 221 according to the present exemplary embodiment. To simplify the description, the torque sensor 221 is described as an example. However, other torque sensors in the other joints also have a similar connection relationship. As illustrated in FIG. 4, the torque sensor 221 includes a cylindrical first fixing member 511, a second fixing member 512, coupling members 513, and an optical encoder 514. The optical encoder 514 is located to face the circumference of the torque sensor 221 with the axis A1 as its center.

The first fixing member 511 and the second fixing member 512 are coupled with the coupling members 513 located on the circumference of the torque sensor 221 so that the first fixing member 511 and the second fixing member 512 can move relative to each other. In the present exemplary embodiment, the first fixing member 511, the second fixing member 512, and the coupling members 513 are integrally formed with the same material. The first fixing member 511 is fastened to the drive flange 241, and the second fixing member 512 is fastened to the link 201. The first fixing member 511 is provided with a stay member 515. The stay member 515 operates as a support member that supports a detection head 521 of the optical encoder 514 to be described below. The stay member 515 is fixed to the first fixing member 511.

The coupling members 513 are formed as rib-like members that couple the doughnut-shaped first fixing member 511 and the second fixing member 512. The coupling members 513 are arranged to form a circle around the axis A2 between the first fixing member 511 and the second fixing member 512. Each portion of the torque sensor 221 is formed using a predetermined material having an elastic modulus depending on an intended torque detection range, a required resolution, or the like. Examples of the predetermined material include resin and metal (steel, stainless steel, etc.). Further, the first fixing member 511, the second fixing member 512, and the coupling members 513 may be manufactured using a three-dimensional (3D) printer. Specifically, the first fixing member 511, the second fixing member 512, and the coupling members 513 can be manufactured by creating slice data for the 3D printer based on design data (e.g., computer aided design (CAD) data) on these members and inputting the data to a known 3D printer. In the present exemplary embodiment, the first fixing member 511, the second fixing member 512, and the coupling members 513, which constitute the torque sensor 222, are formed using the same material, but instead may be formed using different materials.

The optical encoder 514 includes the detection head 521 serving as a detection portion and a scale 522 serving as a detected portion. The detection head 521 is provided on the stay member 515, and the scale 522 is provided on the second fixing member 512. The scale 522 is fixed to each of the first fixing member 511 and the second fixing member 512, and the detection head 521 is fixed to the stay member 515.

The scale 522 is a reflective scale and has a lattice-like optical pattern 531. The optical pattern 531 is formed of, for example, Al and Cr. The detection head 521 is a reflective detection head and includes a light-emitting element 541 and a light-receiving element 542. The stay member 515 is provided with an opening 516 to irradiate the optical pattern 531 with light from the light-emitting element 541 of the detection head 521. This irradiation space is sealed with a seal member 517 to prevent contamination in the irradiation space, and is provided with wiring 518 for supplying electric power to the light-emitting element 541. The detection head 521 irradiates the scale 522 with light from the light-emitting element 541, and the light-receiving element 542 receives light reflected from the optical pattern 531 of the scale 522.

The detection head 521 is provided on the first fixing member 511 and the scale 522 is provided on the second fixing member 512 in the present exemplary embodiment. However, the detection head 521 may be provided on the second fixing member 512 and the scale 522 may be provided on the first fixing member 511. The detection head 521 may be provided on one of the first fixing member 511 and the second fixing member 512 and the scale 522 may be provided on the other of the first fixing member 511 and the second fixing member 512, as long as the relative movement amount can be detected.

In this case, when the first fixing member 511 and the second fixing member 512 rotate relative to each other due to the action of the torque about the axis A2, relative positions of the detection head 521 and the scale 522 change. In addition, the irradiation position of light irradiated on the scale 522 moves on the scale 522.

In this case, when the light irradiated on the scale 522 passes through the pattern 531 provided on the scale 522, the amount of light detected by the light-receiving element 542 of the detection head 521 changes. Based on the change in the amount of light, the relative movement amount of the first fixing member 511 and the second fixing member 512 is detected. A detected torque value is calculated (acquired) by an arithmetic circuit (not illustrated) provided in the torque sensor 221 or the control device 300 using a sensitivity coefficient to convert the relative movement amount detected by the detection head 521 into torque acting on the torque sensor 221.

This scale pattern is not limited to a single scale pattern, but a plurality of gradation patterns can be provided (e.g., in different arrangement phases) depending on a calculation method. A pitch of the scale pattern is determined depending on a resolution required for position detection or the like. In recent years, a scale pattern having a pitch on the order of micrometers (μm) can also be used due to the improvement in the precision and resolution of encoders. As described above, the torque sensors 221 to 226 can detect torque about the axis of the corresponding one of the joints where the torque sensors 221 to 226 are respectively located.

Figures 5A, 5B:
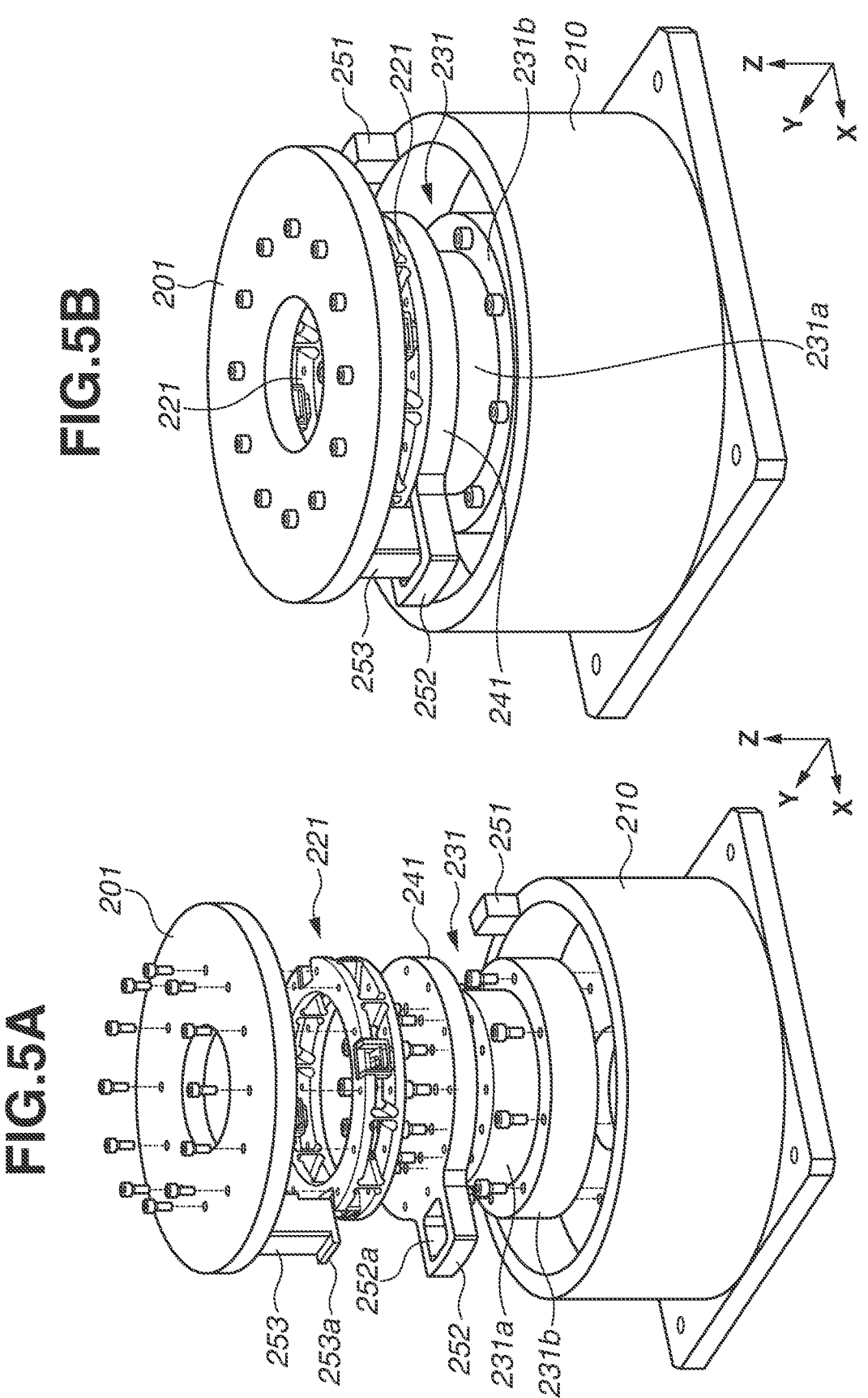
FIGS. 5A and 5B are an exploded view and an assembled view, respectively, illustrating a detailed connection relationship between the link and the base according to the first exemplary embodiment.

FIGS. 5A and 5B each illustrate a more detailed connection relationship between the base 210 and the link 201 of the robot arm body 200 according to the present exemplary embodiment. To simplify the description, the connection relationship between the base 210 and the link 201 is described as an example. However, the other joints may also have a similar connection relationship.

FIG. 5A is an exploded view, and FIG. 5B is an assembled view. In the present exemplary embodiment, the link 201 that rotates relative to the base 210 may be referred to as a first link and the base 210 may be referred to as a second link.

As illustrated in FIGS. 5A and 5B, the driving device 231 is fastened to the inside of the base 210 with bolts using a housing 231*b* that rotatably supports a decelerator output shaft 231*a*. Further, the drive flange 241 is fastened to a surface of the decelerator output shaft 231*a* with bolts. The torque sensor 221 is fastened to the drive flange 241 with bolts, and the link 201 is fastened to the structure of the torque sensor 221. To simplify the illustration, the bolts used to fasten the drive flange 241 and the torque sensor 221 are not illustrated. As illustrated in FIGS. 5A and 5B, the base 210 is provided with a stopper 251, the drive flange 241 is provided with a stopper 252, and the link 201 is provided with a stopper 253. The stoppers 252 and 253 are brought into contact with each other when the base 210 and the link 201 move relative to each other, thereby mechanically limiting the movable range. In the present exemplary embodiment, the stopper 253 may be referred to as a first stopper, the stopper 252 may be referred to as a second stopper, and the stopper 251 may be referred to as a third stopper.

As illustrated in FIGS. 5A and 5B, the stopper 252 of the drive flange 241 is provided with an opening 252*a* as a space in which the stopper 253 is located, and the stopper 253 of the link 201 is provided with a convex boss 253*a*. When the link 201 is fastened to the drive flange 241 via the torque sensor 221 from above in FIG. 5A, the stopper 253 is inserted into the opening 252*a* of the stopper 252 and is fastened. A clearance between the stopper 253 and the stopper 252 when the stopper 253 is inserted into the opening 252*a* is secured by the amount corresponding to the relative displacement amount between the drive flange 241 and the link 201 in the detection range of the torque sensor 221 in clockwise rotation and counterclockwise rotation. In the present exemplary embodiment, a clearance of about 1.0 mm is provided on both sides of the stopper 252. However, the predetermined clearance may be changed, as needed, depending on the specifications of the torque sensor 221. Accordingly, the stopper 253 and the stopper 252 are not brought into contact with each other when the torque sensor 221 is rotating clockwise or counterclockwise with a load within a detectable range.

However, if the stopper 252 and the stopper 251 collide with each other hard and an unexpectedly large impact load (predetermined force) is applied to the torque sensor 221, the stopper 253 and the stopper 252 are brought into contact with each other. Thus, it is possible to reduce, if the stopper 252 and the stopper 251 collide with each other hard and an unexpectedly large load is generated thereby, the generated unexpectedly large load to be directly transmitted to the torque sensor 221 through the drive flange 241. This configuration prevents an unexpectedly large load from being applied to the torque sensor 221, which leads to a reduction in the risk of damaging the torque sensor 221.

Each of the torque sensor 221 and the stoppers 251, 252, and 253 is formed of a predetermined material having an elastic modulus and a tensile strength depending on the intended torque detection range and the required resolution and strength. Examples of the predetermined material include resin and metal (steel, stainless steel, etc.). In the present exemplary embodiment, the torque sensor 221 and the stoppers 251, 252, and 253 are formed of the same material, but instead may be formed of different materials.

According to the present exemplary embodiment described above, if the stopper 252 and the stopper 251 collide with each other hard and an unexpectedly large load is generated thereby, the generated unexpectedly large load to be directly transmitted to the torque sensor 221 through the drive flange 241 can be reduced. Accordingly, when the robot is stopped by the mechanical stopper, the risk of damaging the sensor for detecting a force can be reduced. In addition, the stopper 252 that is a part of the stoppers 251 and 252 for limiting the movable range of each joint can be used with the stopper 253 as the mechanical stopper for reducing the risk of damaging the torque sensor 221. Consequently, the number of required mechanical stoppers can be reduced, which leads to a reduction in the cost of the robot.

Modified Example

Next, a modified example of the present exemplary embodiment will be described in detail. While in the above-described exemplary embodiment, an example is described where the mechanical stopper for limiting the movable range of the link 201 to less than 360° is used, the present exemplary embodiment is not limited to this example. For example, if the movable range of the link 201 is limited to 360° or more, it is effective to use a movable mechanical stopper. This configuration will be described in detail below.

FIGS. 6A and 6B each illustrate a connection relationship between the base 210 and the link 201 of the robot arm body 200 according to the modified example of the present exemplary embodiment. FIG. 6A is an exploded view, and FIG. 6B is an assembled view. As illustrated in FIG. 6A, the driving device 231 is fastened to the base 210 with bolts via the housing 231b, and the drive flange 241 is fastened to the output shaft 231a of the driving device 231 with bolts. The torque sensor 221 is fastened to the drive flange 241 with bolts, and the link 201 is fastened to the opposing surface of the torque sensor 221 with bolts. To simplify the illustration, the bolts used to fasten the drive flange 241 and the torque sensor 221 are not illustrated.

As illustrated in FIG. 6A, the stopper 251 for mechanically limiting the movable range of the link 201 is provided on the inside of the base 210. FIG. 6A illustrates a state where a movable component 254 is detached from a slidable sliding portion 255. As illustrated in FIG. 6B, the movable component 254 is located on the sliding portion 255. The drive flange 241 is provided with the stopper 252 within the size of a diameter from the center of the base 210 to the stopper 251 (to prevent the stopper 252 from contacting the stopper 251). The stopper 252 is provided with the opening 252a, and the stopper 253 provided on the link 201 is inserted into the opening 252a. When the link 201 and the drive flange 241 are moved, the movable component 254 is brought into contact with the stopper 252 and the movable component 254 slides along the sliding portion 255, thereby allowing the movable component 254 to move with the link 201.

When the movable component 254 and the stopper 251 are brought into contact with each other, the movable range of the link 201 is limited thereby.

FIGS. 7A to 7H each illustrate an operation of each stopper according to the modified example of the present exemplary embodiment. In FIGS. 7A to 7H, the illustration of the link 201 and the torque sensor 221 is omitted to facilitate the illustration of the operation of each of the stopper 252 and the movable component 254. In practice, the link 201 is formed above each stopper and the stopper 253 is inserted into the stopper 252 in FIGS. 7A to 7H. A coordinate system is illustrated at a lower right position on the drawing sheet.

FIG. 7A illustrates an initial state of the stopper 252. In the initial state, the movable component 254 is located in the sliding portion 255 and is in contact with the right side of the stopper 251. The stopper 252 of the drive flange 241 is located at a position opposed to the stopper 251. As the drive flange 241 and the stopper 252 are rotated clockwise as indicated by the arrow illustrated in FIG. 7B from the initial state, the stopper 252 and the movable component 254 are brought into contact with each other. Further, as the drive flange 241 and the stopper 252 are rotated clockwise as indicated by the arrow in FIG. 7C, the movable component 254 and the stopper 252 move while being in contact with each other. Further, as the drive flange 241 and the stopper 252 are rotated clockwise as indicated by the arrow in FIG. 7D, the movable component 254 is sandwiched between the stopper 251 and the stopper 252 and is thus not further rotated.

As the drive flange 241 and the stopper 252 are rotated counterclockwise as indicated by the arrow in FIG. 7E from the state illustrated in FIG. 7D, the stopper 252 and the movable component 254 are brought into contact with each other as illustrated in FIG. 7F. Further, as the drive flange 241 and the stopper 252 are rotated counterclockwise as indicated by the arrow in FIG. 7G, the movable component 254 and the stopper 252 move while being in contact with each other. Further, as the drive flange 241 and the stopper 252 are rotated counterclockwise as indicated by the arrow in FIG. 7H, the movable component 254 is sandwiched between the stopper 251 and the stopper 252 and thus is not further rotated. The above-described configuration makes it possible to mechanically limit the operating range even when the link 201 can be rotated by 360° or more.

A clearance between the stopper 253 and the stopper 252 when the stopper 253 is inserted into the opening 252a is secured by the amount corresponding to the relative displacement amount between the drive flange 241 and the link 201 in the detection range of the torque sensor 221. In the modified example of the present exemplary embodiment, a clearance of about 1.0 mm is provided on both sides of the stopper 252. However, the size of the clearance may be changed, as needed, depending on the specifications of the torque sensor 221. Accordingly, the stopper 253 and the stopper 252 are not brought into contact with each other when the torque sensor 221 is rotating clockwise or counterclockwise with a load within a detectable range.

However, if the stopper 252 and the stopper 251 collide with each other hard via the movable component 254 and an unexpectedly impact load is applied to the torque sensor 221, the stopper 253 and the stopper 252 are brought into contact with each other. Accordingly, if the stopper 252 and the stopper 251 collide with each other hard via the movable component 254 and an unexpectedly large load is generated thereby, the generated unexpectedly large load to be directly transmitted to the torque sensor 221 through the drive flange 241 can be reduced. This configuration prevents an unexpectedly large load from being applied to the torque sensor 221, which leads to a reduction in the risk of damaging the torque sensor 221.

According to the above-described modified example, even in a case where a movable mechanical stopper is used, when the stopper 252 and the stopper 251 collide with each other hard and an unexpectedly large load is generated thereby, the generated unexpectedly large load to be directly transmitted to the torque sensor 221 through the drive flange 241 can be reduced.

Accordingly, when the robot is stopped by the mechanical stopper, the risk of damaging the sensor for detecting a force can be reduced. In addition, the stopper 252 that is a part of the stoppers 251 and 252 for limiting the movable range of each joint can be used with the stopper 253 as the mechanical stopper for reducing the risk of damaging the torque sensor 221. Consequently, the number of required mechanical stoppers can be reduced, which leads to a reduction in the cost of the robot.

A second exemplary embodiment will now be described. In the above-described first exemplary embodiment, the clearance between the stopper 252 and the stopper 253 corresponding to the relative displacement amount between the drive flange 241 and the link 201 in the detection range of the torque sensor 221 is secured in the opening 252a of the stopper 252. However, this configuration can also be applied when the clearance is secured in the stopper 253. This configuration will be described in detail below. In the second exemplary embodiment, hardware modules and components of the control system that are different from those of the first exemplary embodiment are illustrated and described below. Components of the second exemplary embodiment that are similar to the components of the first exemplary embodiment have the same configuration and operation, and thus detailed descriptions thereof are omitted.

Figure 8B:
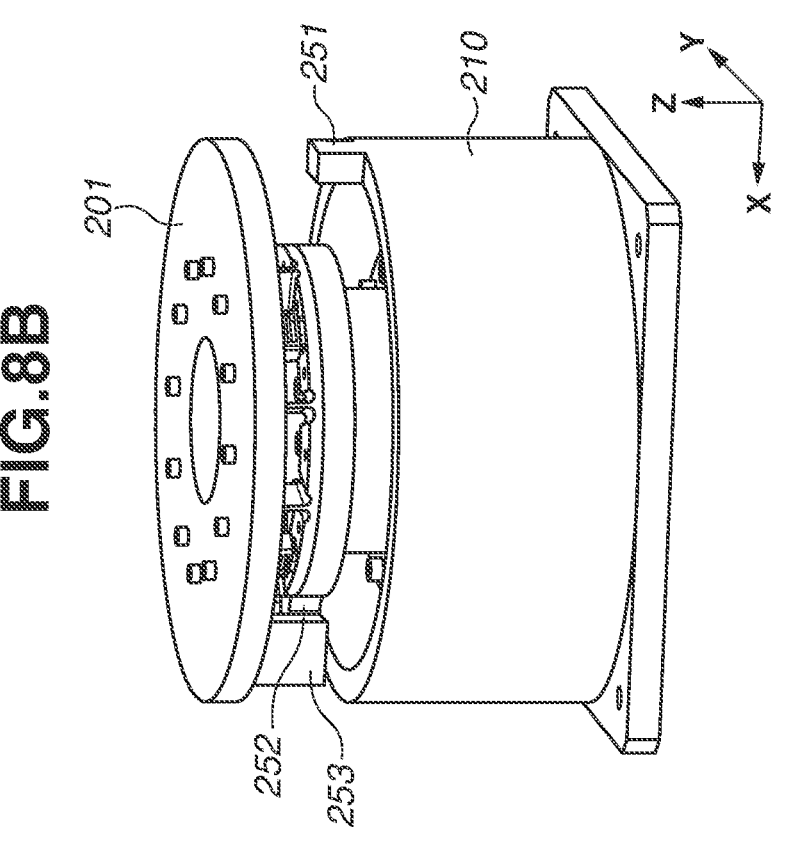
FIGS. 8A and 8B are an exploded view and an assembled view, respectively, illustrating a detailed connection relationship between the link and the base according to a second exemplary embodiment.
Figure 8A:
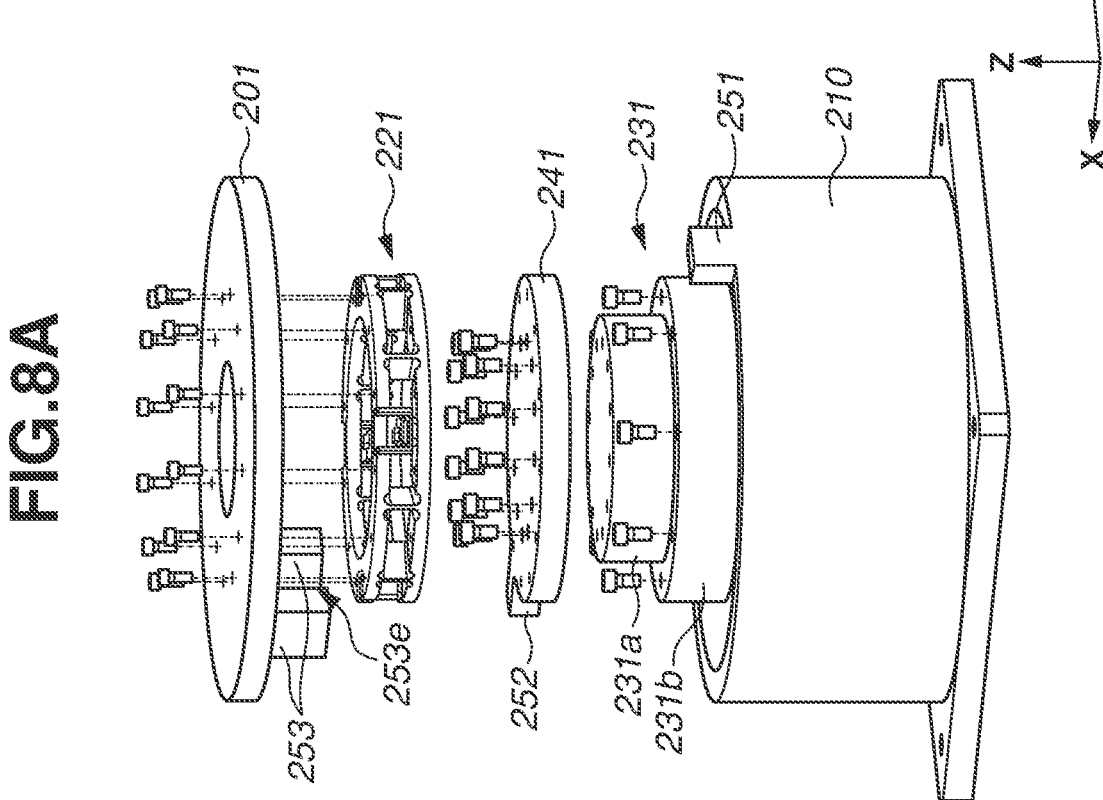

FIGS. 8A and 8B each illustrate a connection relationship between the base 210 and the link 201 of the robot arm body 200 according to the present exemplary embodiment. To simplify the description, the connection relationship between the base 210 and the link 201 is described as an example. However, the other joints may also have a similar connection relationship. FIG. 8A is an exploded view, and FIG. 8B is an assembled view.

As illustrated in FIGS. 8A and 8B, the driving device 231 is fastened to the base 210 with bolts via the housing 231b, and the drive flange 241 is fastened to the output shaft 231a of the driving device 231 with bolts. The torque sensor 221 is fastened to the drive flange 241 with bolts, and the link 201 is fasted to the opposing surface of the torque sensor 221 with bolts. To simplify the illustration, the bolts used to fasten the drive flange 241 and the torque sensor 221 are not illustrated. As illustrated in FIGS. 8A and 8B, the base 210 is provided with the stopper 251, the link 201 is provided with the stopper 253, and the drive flange 241 is provided with the stopper 252. The stoppers 251 and 253 are brought into contact with each other when the base 210 and the link 201 move relative to each other, thereby mechanically limiting the movable range.

As illustrated in FIGS. 8A and 8B, the stopper 253 of the link 201 is composed of two stoppers so that a void 253e can be provided as a space in which the stopper 252 is located. When the link 201 is fastened to the drive flange 241 via the torque sensor 221 from above in FIG. 8A, the stopper 252 is placed in the void 253e of the stopper 253 and is fastened.

A clearance between the stopper 253 and the stopper 252 when the stopper 252 is placed in the void 253e is secured by the amount corresponding to the relative displacement amount between the drive flange 241 and the link 201 in the detection range of the torque sensor 221 in clockwise rotation and counterclockwise rotation. In the present exemplary embodiment, a clearance of about 1.0 mm is provided on both sides of the stopper 252. However, the size of the clearance may be changed, as needed, depending on the specifications of the torque sensor 221. Accordingly, the stopper 253 and the stopper 251 are not brought into contact with each other when the torque sensor 221 is rotating clockwise or counterclockwise with a load within a detectable range.

However, if the stopper 253 and the stopper 251 collide with each other hard and an unexpectedly large impact load is applied to the torque sensor 221, the stopper 253 and the stopper 252 are brought into contact with each other. Thus, if the stopper 253 and the stopper 251 collide with each other hard and an unexpectedly large load is generated thereby, the generated unexpectedly large load to be directly transmitted to the torque sensor 221 through the link 201 can be reduced. This configuration prevents an unexpectedly large load from being applied to the torque sensor 221, which leads to a reduction in the risk of damaging the torque sensor 221.

According to the present exemplary embodiment described above, if the stopper 253 and the stopper 251 collide with each other hard and an unexpectedly large load is generated thereby, the generated unexpectedly large load to be directly transmitted to the torque sensor 221 through the link 201 can be reduced. Accordingly, when the robot is stopped by the mechanical stopper, the risk of damaging the sensor for detecting a force can be reduced. In addition, the stopper 253 that is a part of the stoppers 251 and 253 for limiting the movable range of each joint can be used with the stopper 252 as the mechanical stopper for reducing the risk of damaging the torque sensor 221. Consequently, the number of required mechanical stoppers can be reduced, which leads to a reduction in the cost of the robot. In a predetermined robot, the present exemplary embodiment and modified examples thereof can be carried out in combination with the above-described exemplary embodiment and modified examples thereof.

A third exemplary embodiment will now be described. In the above-described exemplary embodiments, the descriptions are given of a case where the stopper 252 and the stopper 253 are constantly fixed to the drive flange 241 and the link 201. However, the stopper 252 or the stopper 253 may be detachably mounted. This configuration according to the present exemplary embodiment will be described in detail below. In the third exemplary embodiment, hardware modules and components of the control system that are different from those of the above-described exemplary embodiments are illustrated and described below. Components of the third exemplary embodiment that are similar to the components of the above-described exemplary embodiments have the same configuration and operation, and thus detailed descriptions thereof are omitted.

Figure 9B:
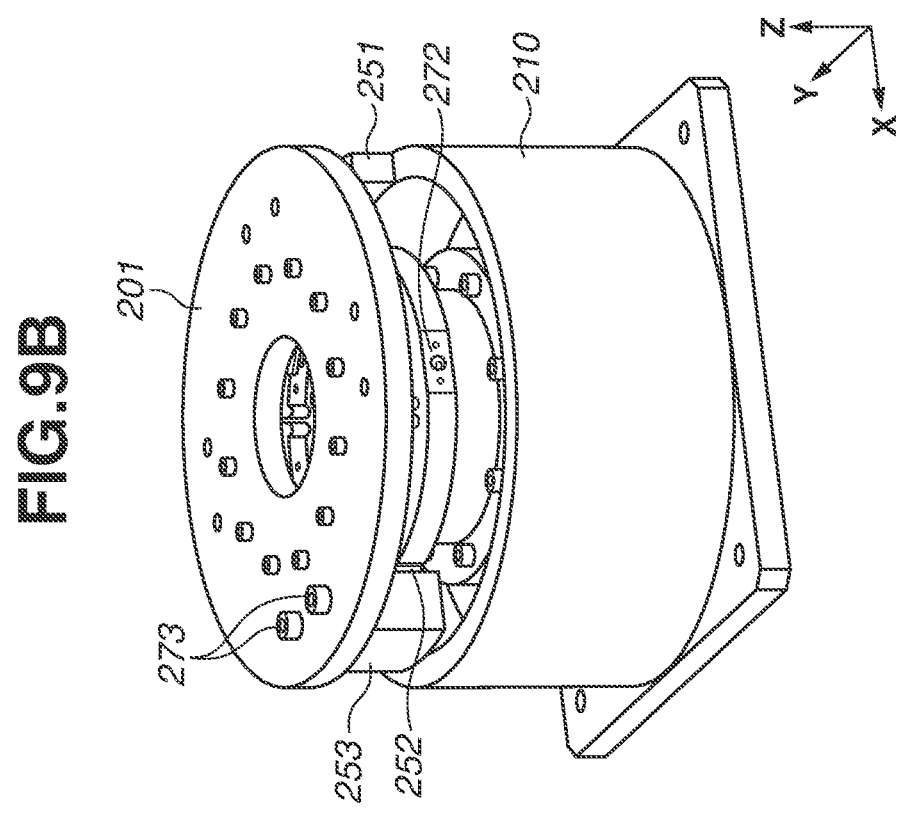
FIGS. 9A and 9B are an exploded view and an assembled view, respectively, illustrating a detailed connection relationship between the link and the base according to a third exemplary embodiment.
Figure 9A:
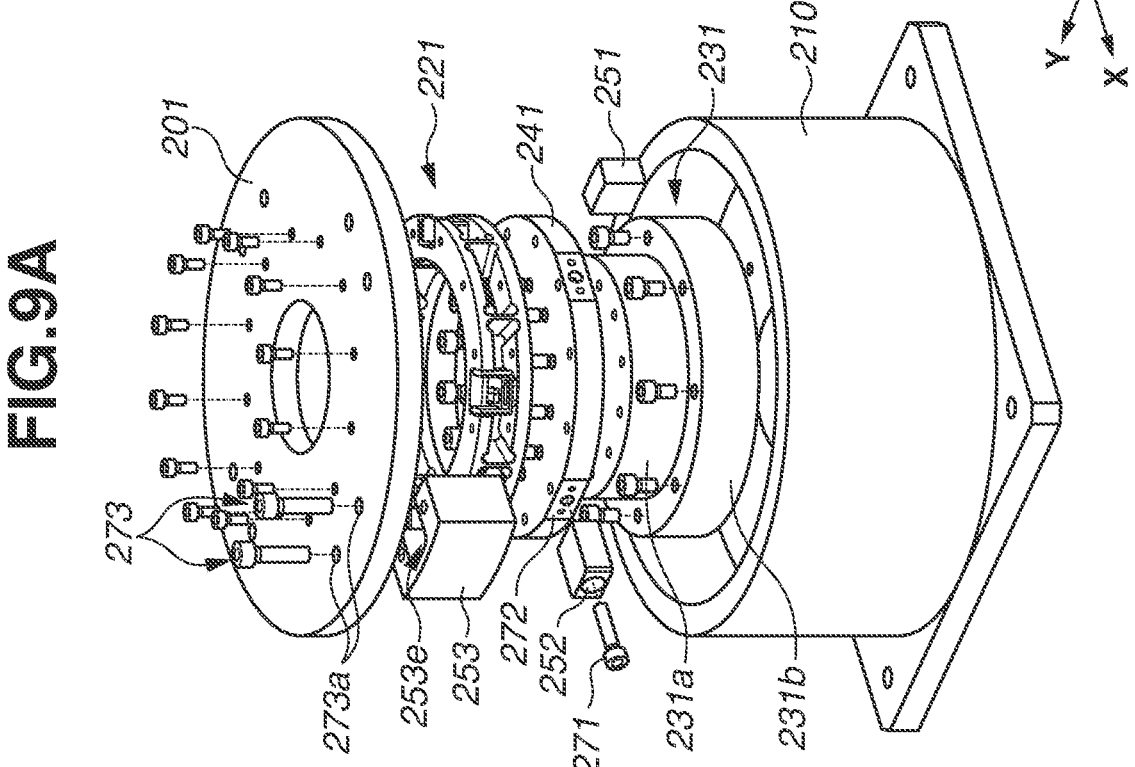

FIGS. 9A and 9B each illustrate a connection relationship between the base 210 and the link 201 of the robot arm body 200 according to the present exemplary embodiment. To simplify the description, the connection relationship between the base 210 and the link 201 is described as an example. However, the other joints also have a similar connection relationship. FIG. 9A is an exploded view, and FIG. 9B is an assembled view. As illustrated in FIGS. 9A and 9B, the driving device 231 is fastened to the base 210 with bolts via the housing 231b, and the drive flange 241 is fastened to the output shaft 231a of the driving device 231 with bolts. The torque sensor 221 is fastened to the drive flange 241 with bolts. Further, the link 201 is fastened to the opposing surface of the torque sensor 221 with bolts.

To simplify the illustration, the bolts used to fasten the drive flange 241 and the torque sensor 221 are not illustrated. As illustrated in FIGS. 9A and 9B, the base 210 is provided with the stopper 251.

The stopper 253 is provided with a pair of screw holes 253b (FIG. 10) so that the stopper 253 can be detachably mounted on the link 201 with a pair of bolts 273. The link 201 is provided with a pair of through-holes 273a through which the bolts 273 respectively penetrate.

The stopper 252 is detachably mounted on the drive flange 241 with a bolt 271 and mounting portions 272. The stoppers 251 and 253 are brought into contact with each other when the base 210 and the link 201 move relative to each other, thereby mechanically limiting the movable range. A plurality of mounting portions 272 is provided at any locations on the circumference of the drive flange 241. In the present exemplary embodiment, four mounting portions 272, including two mounting portions 272 illustrated in FIG. 9A and two more mounting portions 272 located at 180° opposite to the two mounting portions 272 on the back side of FIG. 9A. Similarly, a pair of bolts 273 is provided at a position corresponding to each of the mounting portions 272, and four pairs of through-holes 273a (i.e., eight through-holes 273a) are provided.

As illustrated in FIGS. 9A and 9B, the stopper 253 of the link 201 is provided with the void 253e as a space in which the stopper 252 is accommodated. When the link 201 is fastened to the drive flange 241 via the torque sensor 221 from above in FIG. 9A, the stopper 252 is placed in the void 253e of the stopper 253 and is fastened. A clearance between the stopper 253 and the stopper 252 when the stopper 252 is placed in the void 253e is secured by the amount corresponding to the relative displacement amount between the drive flange 241 and the link 201 in the detection range of the torque sensor 221 in clockwise rotation and counterclockwise rotation. In the present exemplary embodiment, a clearance of about 1.0 mm is provided on both sides of the stopper 252. However, the size of the clearance may be changed, as needed, depending on the specifications of the torque sensor 221. Accordingly, the stopper 253 and the stopper 252 are not brought into contact with each other when the torque sensor 221 is rotating clockwise or counterclockwise with a load within a detectable range.

However, if the stopper 251 and the stopper 253 collide with each other hard and an unexpectedly large impact load is applied to the torque sensor 221, the stopper 253 and the stopper 252 are brought into contact with each other. Accordingly, if the stopper 253 and the stopper 251 collide with each other hard and an unexpectedly large load is generated thereby, the generated unexpectedly large load to be directly transmitted to the torque sensor 221 through the link 201 can be reduced. This configuration prevents an unexpectedly large load from being applied to the torque sensor 221, which leads to a reduction in the risk of damaging the torque sensor 221.

Figure 10:
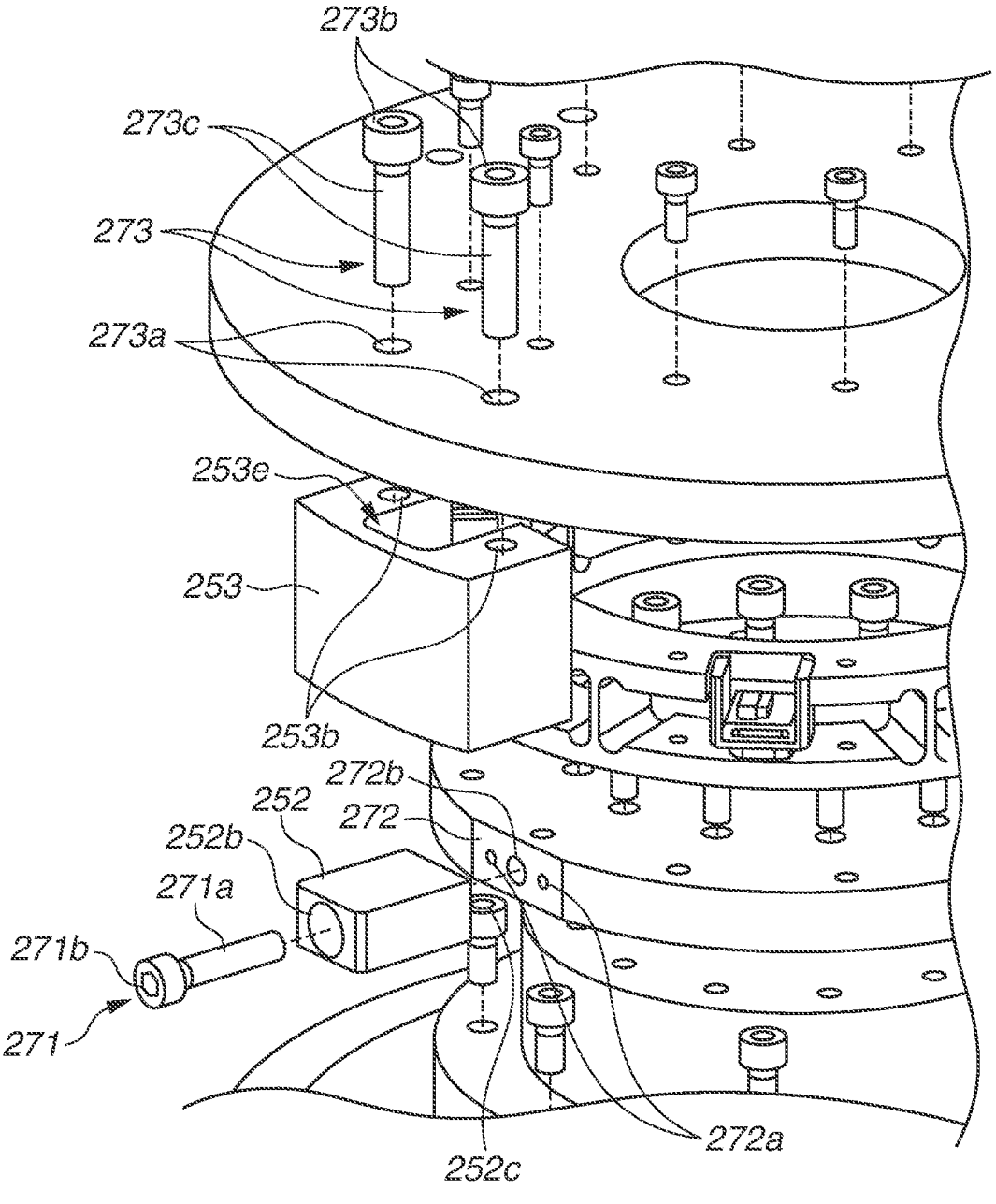
FIG. 10 illustrates a detailed configuration of stoppers according to the third exemplary embodiment.

FIG. 10 illustrates a detailed configuration of each of the stopper 252 and the stopper 253 according to the present exemplary embodiment. As illustrated in FIG. 10, the stopper 252 is provided with a through-hole 252b through which the bolt 271 penetrates and two pins 252c. While FIG. 10 illustrates only one pin 252c, another pin 252c is provided on the back side in FIG. 10. The mounting portion 272 is provided with two pin holes 272a through which the pins 252c are respectively inserted and an internally threaded screw hole 272b through which the bolt 271 is fastened. The through-hole 252b is provided such that a screw portion 271a of the bolt 271 penetrates through the through-hole 252b and is fastened to the screw hole 272b. A head portion 271b of the bolt 271 does not penetrate through the through-hole 252b. The pins 252c of the stopper 252 are inserted into the pin holes 272a, respectively, thereby positioning the stopper 252 with respect to the drive flange 241. The bolt 271 is made to penetrate through the through-hole 252b and is fastened to the screw hole 272b, thereby fixing the drive flange 241 to the stopper 252. The stopper 252 can be detached from the drive flange 241 by unscrewing the bolt 271.

As illustrated in FIG. 10, the stopper 253 is provided with the void 253e and two internally threaded screw holes 253b through which the bolts 273 are fastened. The link 201 is provided with two through-holes 273a through which the bolts 273 respectively penetrate. Screw portions 273c of the bolts 273 are made to penetrate through the through-holes 273a and are fastened to the screw holes 253b, respectively, thereby fixing the stopper 253 to the link 201. The stopper 253 can be detached from the link 201 by unscrewing the bolts 273. The diameter of each through-hole 273a is larger than the diameter of each of the screw portion 273c of the bolt 273 and the screw hole 253b, and is smaller than the diameter of the head portion 273b of the bolt 273. Thus, in a state where the stopper 252 is fixed to the drive flange 241 and the link 201 is fastened to the torque sensor 221, the fastening position of the stopper 253 can be adjusted within the diameter range of each through-hole 273a.

According to the present exemplary embodiment described above, if the stopper 251 and the stopper 253 collide with each other hard and an unexpectedly large load is generated thereby, the generated unexpectedly large load to be directly transmitted to the torque sensor 221 through the link 201 can be reduced. Thus, when the robot is stopped by the mechanical stopper, the risk of damaging the sensor for detecting a force can be reduced. In addition, the stopper 253 that is a part of the stoppers 251 and 253 for limiting the movable range of each joint can be used with the stopper 252 as the mechanical stopper for reducing the risk of damaging the torque sensor 221. Consequently, the number of required mechanical stoppers can be reduced, which leads to a reduction in the cost of the robot.

Further, in the present exemplary embodiment, the stopper 252 and the stopper 253 are detachably mounted.

Accordingly, the stopper 252 and the stopper 253 can be mounted in a state where the robot arm body 200 is assembled. This configuration makes it possible to reduce the risk of damage when the stopper 252 and the stopper 253 are brought into contact with each other during assembly of the robot arm body 200. Further, the stopper 253 is configured to be positionally adjustable. Accordingly, the stopper 252 and the stopper 253 can be mounted while relative positions of the stopper 252 and the stopper 253 are adjusted in the state where the robot arm body 200 is assembled. Furthermore, the mounting portions 272 and the through-holes 273a enable the stopper 252 and the stopper 253 to be fixed at any position.

While the position of the stopper 253 can be adjusted in the present exemplary embodiment, the position of the stopper 252 may be adjusted. In the present exemplary embodiment, the stopper 252 is provided with pins for positioning and the mounting portion 272 is provided with pin holes. Alternatively, the stopper 252 may be provided with pin holes and the mounting portion 272 may be provided with pins. The stopper 253 may be provided with pins or pin holes, and the link 201 may include mounting portions and may be provided with pins or pin holes. In a predetermined robot, the present exemplary embodiment and modified examples thereof can be carried out in combination with the above-described exemplary embodiments and modified examples thereof.

A fourth exemplary embodiment will now be described. While in the above-described exemplary embodiments, the descriptions are given of a case where the stopper 252 and the stopper 253 are provided at portions of the drive flange 241 and the link 201 on the outside of the torque sensor 221. However, the stopper 252 or the stopper 253 may be provided on the inside of the torque sensor 221. This configuration according to the present exemplary embodiment will be described in detail below. In the fourth exemplary embodiment, hardware modules and components of the control system that are different from those of the above-described exemplary embodiments are illustrated and described below. Components of the fourth exemplary embodiment that are similar to the components of the above-described exemplary embodiments have the same configuration and operation, and thus detailed descriptions thereof are omitted.

Figure 11B:
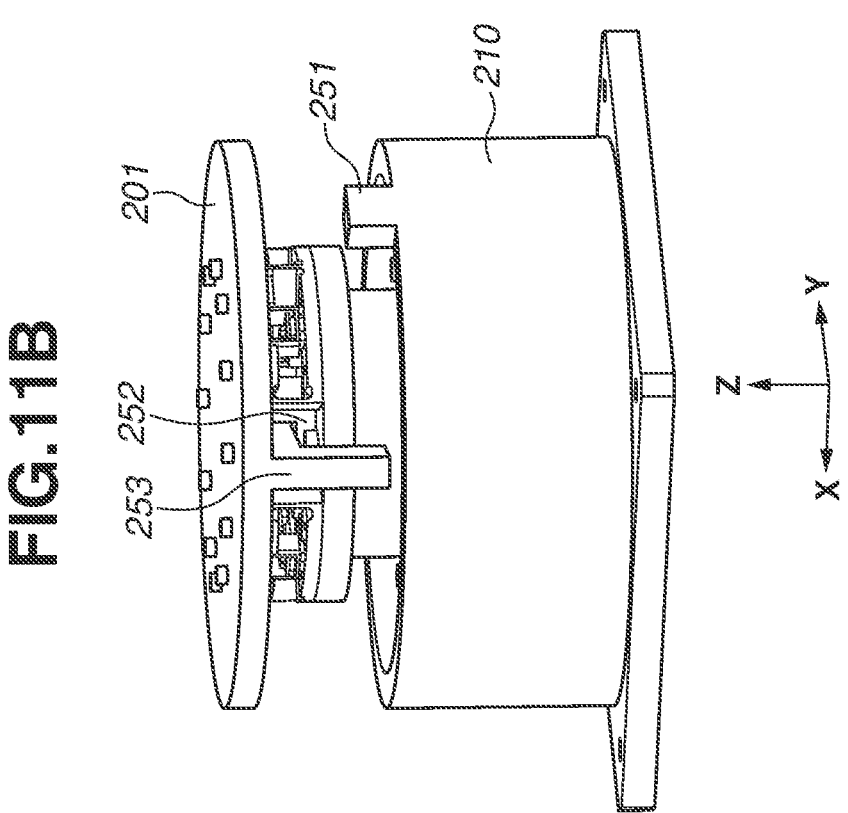
FIGS. 11A and 11B are an exploded view and an assembled view, respectively, illustrating a detailed connection relationship between the link and the base according to a fourth exemplary embodiment.
Figure 11A:
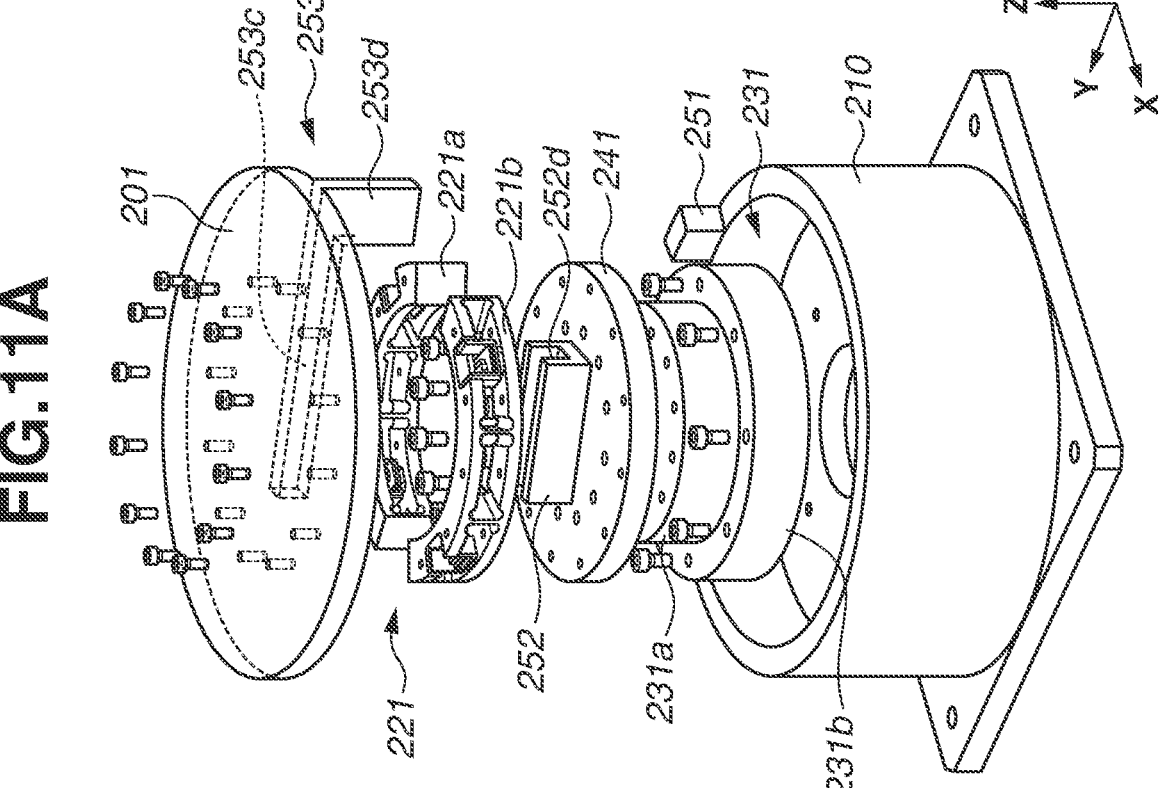

FIGS. 11A and 11B each illustrate a more detailed connection relationship between the base 210 and the link 201 of the robot arm body 200 according to the present exemplary embodiment. To simplify the description, the connection relationship between the base 210 and the link 201 is described as an example. However, the other joints may also have a similar connection relationship. FIG. 11A is an exploded view, and FIG. 11B is an assembled view. As illustrated in FIGS. 11A and 11B, the driving device 231 is fastened to the inside of the base 210 with bolts using the housing 231b that rotatably supports the decelerator output shaft 231a. Further, the drive flange 241 is fastened to the surface of the decelerator output shaft 231a with bolts. The torque sensor 221 is fastened to the drive flange 241, and the link 201 is fastened to the structure of the torque sensor 221. To simplify the illustration, the bolts used to fasten the drive flange 241 and the torque sensor 221 are not illustrated.

In the present exemplary embodiment, the structure of the torque sensor 221 is divided into a partial torque sensor 221a and a partial torque sensor 221b that are provided on the drive flange 241, and the stopper 252 is provided between the partial torque sensor 221a and the partial torque sensor 221b. Assume that the partial torque sensor 221a and the partial torque sensor 221b are fastened to the link 201 so as to have substantially the same relative displacement amount when the link 201 is operated. As illustrated in FIGS. 11A and 11B, the base 210 is provided with the stopper 251, and the link 201 is provided with the stopper 253 having an inverted L-shape. The stopper 251 and the stopper 253 are brought into contact with each other when the base 210 and the link 201 move relatively to each other, thereby mechanically limiting the movable range.

As illustrated in FIGS. 11A and 11B, the stopper 252 of the drive flange 241 is provided with a groove portion 252d as a space in which the stopper 253 is located. The stopper 253 is provided with a contact portion 253c to be placed in the groove portion 252d and a contact portion 253d to be brought into contact with the stopper 251. When the link 201 is fastened to the drive flange 241 via the torque sensor 221 from above in FIG. 11A, the contact portion 253c of the stopper 253 is placed in the groove portion 252d of the stopper 252 and is fastened. A clearance between the stopper 253 and the stopper 252 when the contact portion 253c of the stopper 253 is placed in the groove portion 252d is secured by the amount corresponding to the relative displacement amount between the drive flange 241 and the link 201 in the detection range of the torque sensor 221 in clockwise rotation and counterclockwise rotation. In the present exemplary embodiment, a clearance of about 1.0 mm is provided on both sides of the stopper 253. However, the size of the clearance may be changed, as needed, depending on the specifications of the torque sensor 221. Accordingly, the stopper 253 and the stopper 252 are not brought into contact with each other when the torque sensor 221 is rotating clockwise or counterclockwise with a load within a detectable range.

However, if the contact portion 253d of the stopper 253 and the stopper 251 collide with each other hard and an unexpectedly large impact load is applied to the torque sensor 221, the stopper 253 and the stopper 252 are brought into contact with each other. Accordingly, if the stopper 253 and the stopper 251 collide with each other hard an unexpectedly large load is generated thereby, the generated unexpectedly large load to be directly transmitted to the torque sensor 221 through the link 201 can be reduced. This configuration prevents an unexpectedly large load from being applied to the torque sensor 221, which leads to a reduction in the risk of damaging the torque sensor 221.

According to the present exemplary embodiment described above, if the stopper 253 and the stopper 251 collide with each other hard and an unexpectedly large load is generated thereby, the generated unexpectedly large load to be directly transmitted to the torque sensor 221 through the link 201 can be reduced. Accordingly, when the robot is stopped by the mechanical stopper, the risk of damaging the sensor for detecting a force can be reduced. In addition, the stopper 253 that is a part of the stoppers 251 and 253 for limiting the movable range of each joint can be used with the stopper 252 as the mechanical stopper for reducing the risk of damaging the torque sensor 221. Consequently, the number of required mechanical stoppers can be reduced, which leads to a reduction in the cost of the robot. Furthermore, each stopper can be located inside the torque sensor 221, which leads to a reduction in the size of each joint portion in the diameter direction of the robot arm body 200. In the present exemplary embodiment, the torque sensor 221 is divided into two portions, but instead may be divided into three or more portions depending on the stopper 252 to be provided. In a predetermined robot, the present exemplary embodiment and modified examples thereof can be carried out in combination with the above-described exemplary embodiments and modified examples thereof.

Next, a fifth exemplary embodiment of the present disclosure will be described. In the above-described exemplary embodiments, the risk of breaking each torque sensor can be reduced by providing the mechanical stopper with a mechanical mechanism. In the present exemplary embodiment, a description will be given in detail of not only the configuration for detecting the approach or contact state of the mechanical stopper by each torque sensor to reduce the risk of breaking the mechanical stopper, but also a configuration for controlling a position and orientation when a robot apparatus is stopped to enhance the safety. In the fifth exemplary embodiment, hardware modules and components of the control system that are different from those of the above-described exemplary embodiments are illustrated and described below. Components of the fifth exemplary embodiment that are similar to the components of the above-described exemplary embodiments have the same configuration and operation, and thus detailed descriptions thereof are omitted.

Figure 12B:
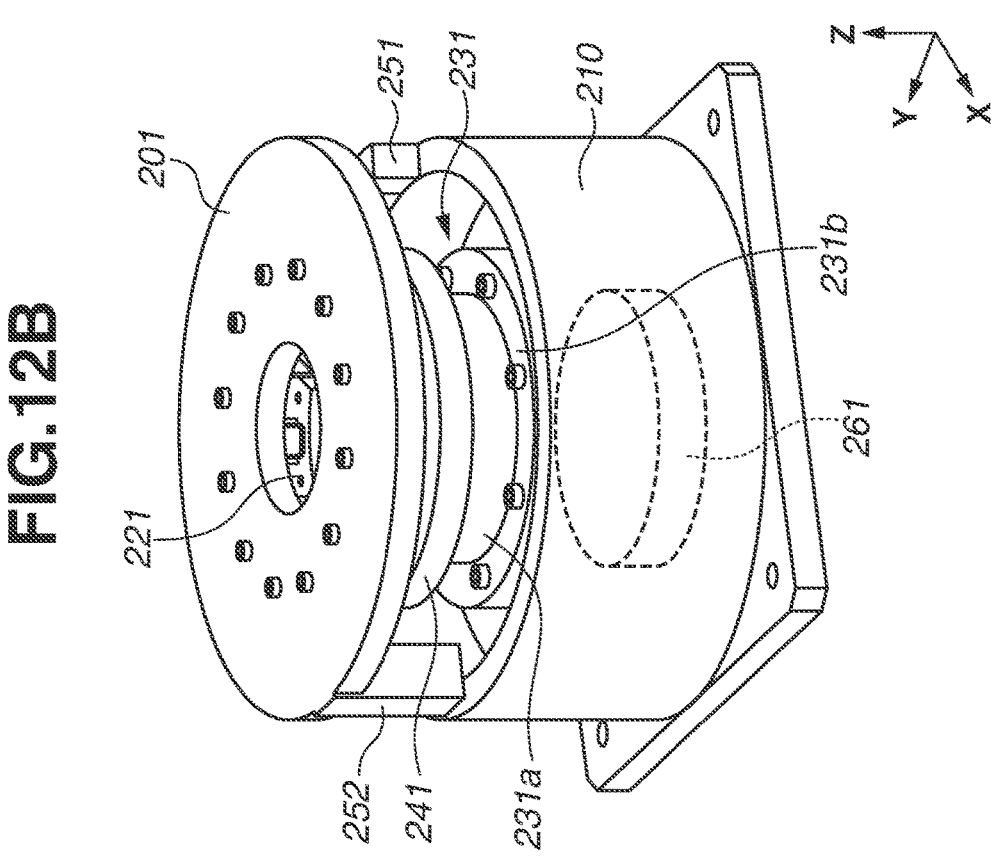
FIGS. 12A and 12B are an exploded view and an assembled view, respectively, illustrating a detailed connection relationship between the link and the base according to a fifth exemplary embodiment.
Figure 12A:
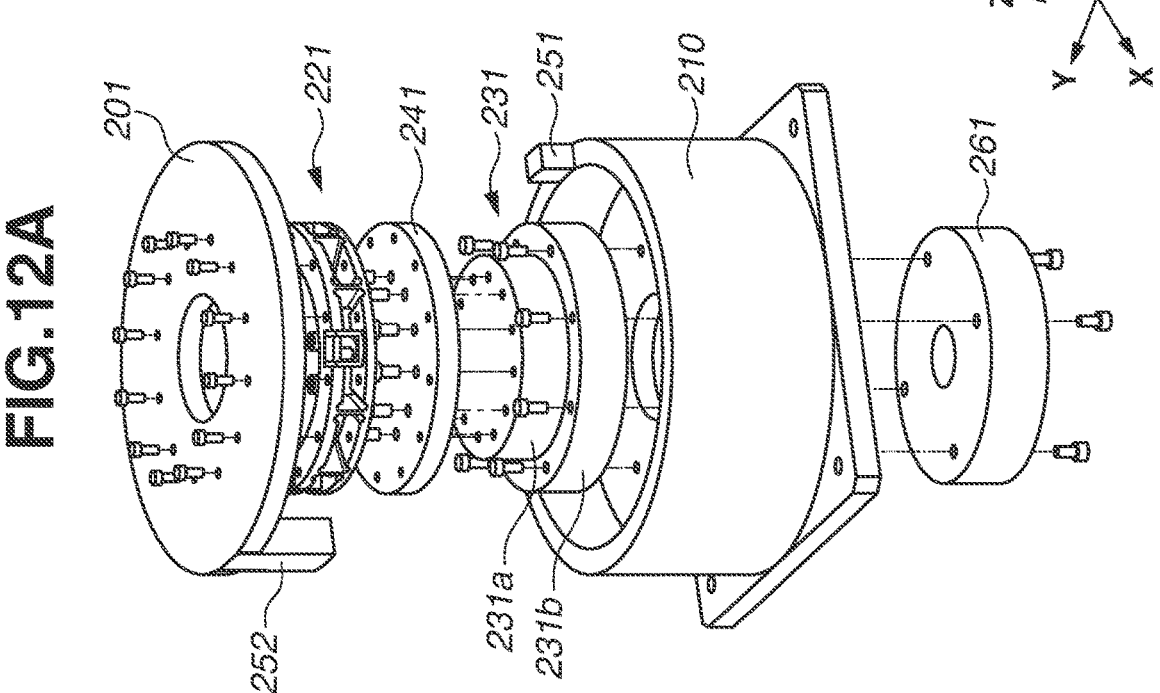

FIGS. 12A and 12B each illustrate a detailed connection relationship between the base 210 and the link 201 of the robot arm body 200 according to the present exemplary embodiment. FIG. 12A is an exploded view, and FIG. 12B is an assembled view. As illustrated in FIGS. 12A and 12B, the driving device 231 is fastened to the inside of the base 210 with bolts using the housing 231b that rotatably supports the decelerator output shaft 231a. The driving device 231 includes a brake 261. Further, the drive flange 241 is fastened to the surface of the decelerator output shaft 231a with bolts. The torque sensor 221 is fastened to the drive flange 241, and the link 201 is fastened to the structure of the torque sensor 221. To simplify the illustration, the bolts used to fasten the drive flange 241 and the torque sensor 221 are not illustrated. As illustrated in FIGS. 12A and 12B, in the present exemplary embodiment, the base 210 is provided with the stopper 251, the link 201 is provided with the stopper 252, and the stopper 251 and the stopper 252 are brought into contact with each other when the base 210 and the link 201 move relative to each other, thereby mechanically limiting the movable range. In the present exemplary embodiment, the stopper 251 may be referred to as the first stopper and the stopper 252 may be referred to as the second stopper.

Each of the torque sensor 221 and the stoppers 251 and 252 is formed of a predetermined material having an elastic modulus and a tensile strength depending on the intended torque detection range and the required resolution and strength. Examples of the predetermined material include resin and metal (steel, stainless steel, etc.). In the present exemplary embodiment, the torque sensor 221 and the stoppers 251 and 252 are formed of the same material, but instead may be formed using different materials.

Figure 13:
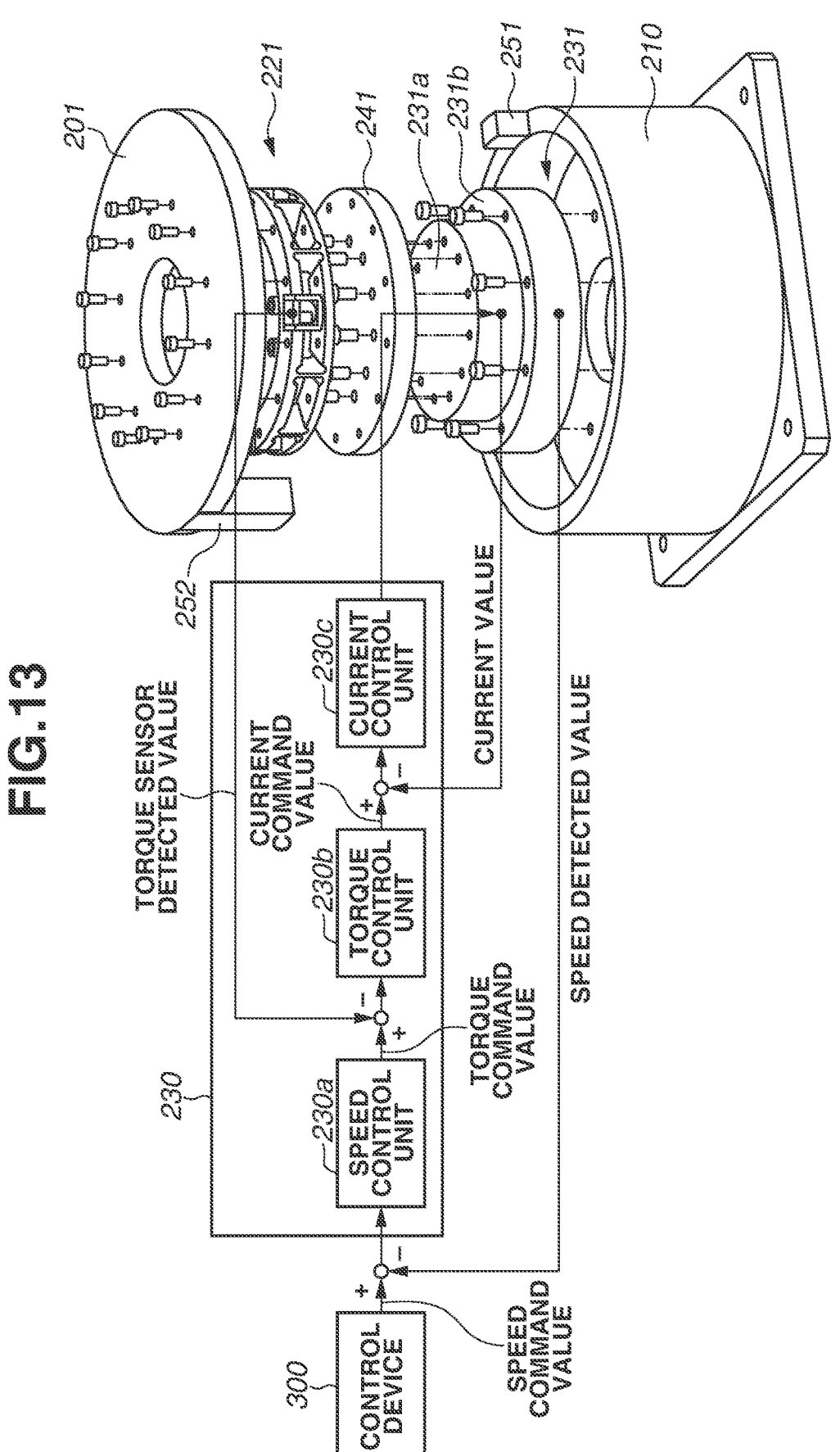
FIG. 13 is a control block diagram illustrating a driving device according to the fifth exemplary embodiment.

FIG. 13 illustrates details of control blocks of the driving device 231 according to the present exemplary embodiment. The arm motor driver 230 for controlling the driving device 231 includes a speed control unit 230a, a torque control unit 230b, and a current control unit 230c. Like the control device 300, the arm motor driver 230 also includes a CPU, a RAM, a ROM, and an interface and is configured to execute the functional units.

As illustrated in FIG. 13, speed information on the driving device 231 is fed back based on a detected value (detection result) from the encoder 211 of the driving device 231, and a speed command value is output from the control device 300 to the speed control unit 230a. The speed control unit

230a generates a torque command value based on the speed command value and the speed information. A torque sensor detected value (detection result) from the torque sensor 211 is fed back to the torque command value and is output to the torque control unit 230b. The torque control unit 230b generates a current command value based on the torque command value and the torque sensor detected value. The current value in the motor of the driving device 231 is fed back to the generated current command value, and feedback control for the motor of the driving device 231 is executed via the current control unit 230c.

Figure 14:
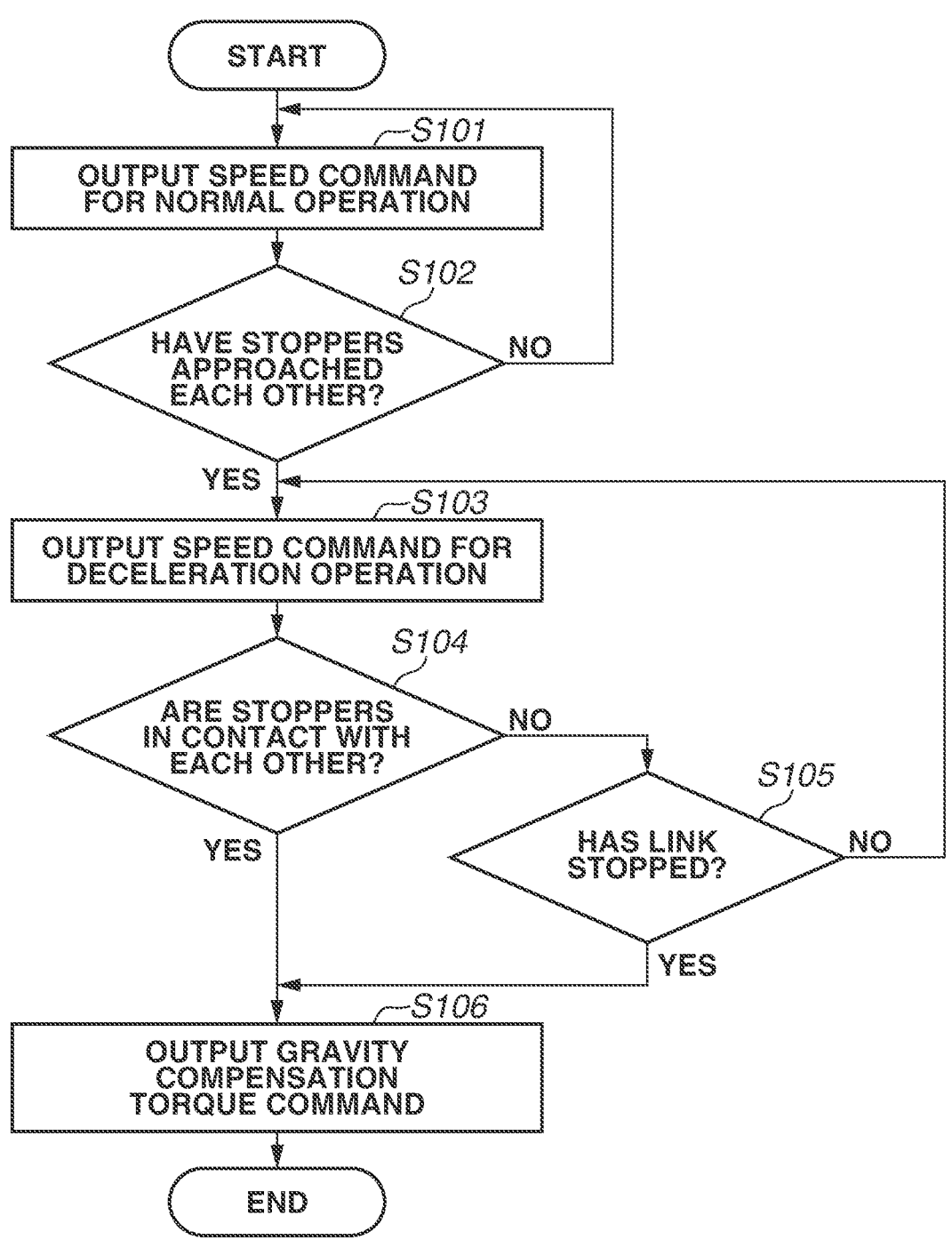
FIG. 14 is a control flowchart according to the fifth exemplary embodiment.

FIG. 14 is a control flowchart according to the present exemplary embodiment. The control processing in the flowchart to be described below is executed by the control device 300 and the arm motor driver 230. The flowchart of the control processing will be described assuming that control processing is executed when the stopper 251 and the stopper 252 are brought into contact with each other during a normal arm operation. Control processing for operating the link 201 is described as an example. In the present exemplary embodiment, the torque sensor 221 and the encoder 211 detect a contact state between the stopper 251 and the stopper 252, including a contact state where the stopper 251 and the stopper 252 are in contact with each other and an approach state where the stopper 251 and the stopper 252 have approached each other.

First, in step S101, the control device 300 outputs a speed command for causing the link 201 to operate in a normal operation to the motor of the driving device 231 via the arm motor driver 230.

In step S102, it is determined whether the stopper 251 and the stopper 252 have approached each other. In this determination processing, the value of the encoder 211 in a state where the stopper 251 and the stopper 252 are in contact with each other is preliminarily acquired, and a threshold in a predetermined range is set based on the value and stored in the control device 300. In step S102, it is determined whether the detected value of the encoder 211 satisfies the threshold, thereby determining whether the stopper 251 and the stopper 252 have approached each other. In the present exemplary embodiment, a threshold for a state where the stopper 251 and the stopper 252 are brought into contact with each other when the link 201 rotates clockwise and a threshold for a state where the stopper 251 and the stopper 252 are brought into contact with each other when the link 201 rotates counterclockwise are stored. In the present exemplary embodiment, the thresholds are set by a motor encoder, but instead may be set using an encoder (output shaft encoder) configured to directly detect the position of the link 201. If it is determined that the stopper 251 and the stopper 252 have not approached each other (NO in step S102), the processing returns to step S101, and the control device 300 outputs a speed command to continue the normal operation of the link 201. If it is determined that the stopper 251 and the stopper 252 have approached each other (YES in step S102), the processing proceeds to step S103.

In step S103, the control device 300 outputs a speed command for decelerating the operation of the link 201 to the motor of the driving device 231 via the arm motor driver 230. This deceleration operation is implemented by increasing a viscous term as a control item for the motor of the driving device 231. The deceleration of the operation of the link 201 is implemented by increasing the viscous term. In addition, the deceleration of the operation of the link 201 may be implemented by gradually decreasing the speed command value. The brake 261 also may be used to implement the deceleration of the operation of the link 201.

In step S104, it is determined whether the stopper 251 and the stopper 252 are in contact with each other. In the present exemplary embodiment, the torque sensor 221 detects a force generated when the stopper 251 and the stopper 252 are brought into contact with each other, thereby determining whether the stopper 251 and the stopper 252 are brought into contact with each other. A mean value of forces generated by bringing the stopper 251 and the stopper 252 into contact with each other several times in advance is set as a threshold for contact determination and stored in the control device 300. The threshold may be set by bringing the stopper 251 and the stopper 252 into contact with each other several times in clockwise rotation and bringing the stopper 251 and the stopper 252 into contact with each other several times in counterclockwise rotation. Alternatively, two types of thresholds, i.e., a threshold for clockwise rotation and a threshold for counterclockwise rotation may be stored. If it is determined that the stopper 251 and the stopper 252 are not in contact with each other (NO in step S104), the processing proceeds to step S105. If it is determined that the stopper 251 and the stopper 252 are in contact with each other (YES in step S104), the processing proceeds to step S106.

In step S105, it is determined whether the link 201 has stopped based on the detected value of the encoder 211 of the driving device 231. This determination is made based on whether the temporal displacement amount of the encoder detected value is "0" or is approximate to "0". If it is determined that the link 201 has not stopped (NO in step S105), the processing returns to step S103, and the control device 300 continues the deceleration operation of the link 201. If it is determined that the link 201 has stopped (YES in step S105), the processing proceeds to step S106.

If the stopper 251 and the stopper 252 are in contact with each other (YES in step S104) and the link 201 has stopped, or if the link 201 has stopped (YES in step S105) before the stopper 251 and the stopper 252 are brought into contact with each other, the processing proceeds to step S106. In step S106, the control device 300 outputs a torque command (gravity compensation torque command) for compensating for the weight of the link 201 so as to maintain the stopped state to the motor of the driving device 231 via the arm motor driver 230. In this processing, when an external force is applied to the link 201 by a user, the link 201 operates along with the external force. Then, the flow of the control processing ends.

According to the present exemplary embodiment described above, in a state where the stoppers 251 and 252 are brought into contact with each other and the link 201 has stopped using the torque sensor 221, the torque command for compensating for the weight of the link 201 is output to control the stopped state of the link 201 to be maintained. Thus, the stopped state of the link 201 can be maintained not only by the stoppers 251 and 252, but also by the driving device 231, which leads to a reduction in the possibility that the orientation of the robot arm cannot be maintained by the stoppers 251 and 252. The approach state between the stoppers 251 and 252 is detected and the link 201 is decelerated, and the torque command value for compensating for the weight of the link 201 is immediately output upon detection of the contact state as well. Accordingly, adverse effects of the operation of the link 201 and for the weight of the link 201 upon the torque sensor 221 can be reduced, and the possibility of breaking the torque sensor 221 can also be reduced.

When an external force is applied by the user in the state where the stopped state of the link 201 is maintained, the link 201 is configured to operate along with the external force. This enables the user to easily and rapidly perform a recovery operation for the robot arm body 200 that is in the stopped state.

Further, it is determined whether the link 201 has stopped in a state where the link 201 is decelerated and the stoppers are in contact with each other. Accordingly, even in a case where the stoppers are stopped in a non-contact state, the torque command for compensating for the weight of the link 201 is output, and when an external force is applied by the user, the link 201 can operate along with the external force, thereby making it possible to deal with an irregular stop operation. In a predetermined robot, the present exemplary embodiment and modified examples thereof can be carried out in combination with the above-described exemplary embodiments and modified examples thereof.

A sixth exemplary embodiment will now be described. In the fifth exemplary embodiment described above, if the link 201 has stopped, the torque command for compensating for the weight of the link 201 is output, and when an external force is applied by the user, the link 201 operates along with the external force. However, if a recovery orientation (predetermined orientation) is determined in advance and there is no risk that the robot arm body 200 is brought into contact with a peripheral object during a recovery operation, the recovery operation for recovering from the stopped state may be automatically performed. This configuration will be described in detail below. In the sixth exemplary embodiment, hardware modules and components of the control system that are different from those of the above-described exemplary embodiments are illustrated and described below. Components of the sixth exemplary embodiment that are similar to the components of the above-described exemplary embodiments have the same configuration and operation, and thus detailed descriptions thereof are omitted.

Figure 15:
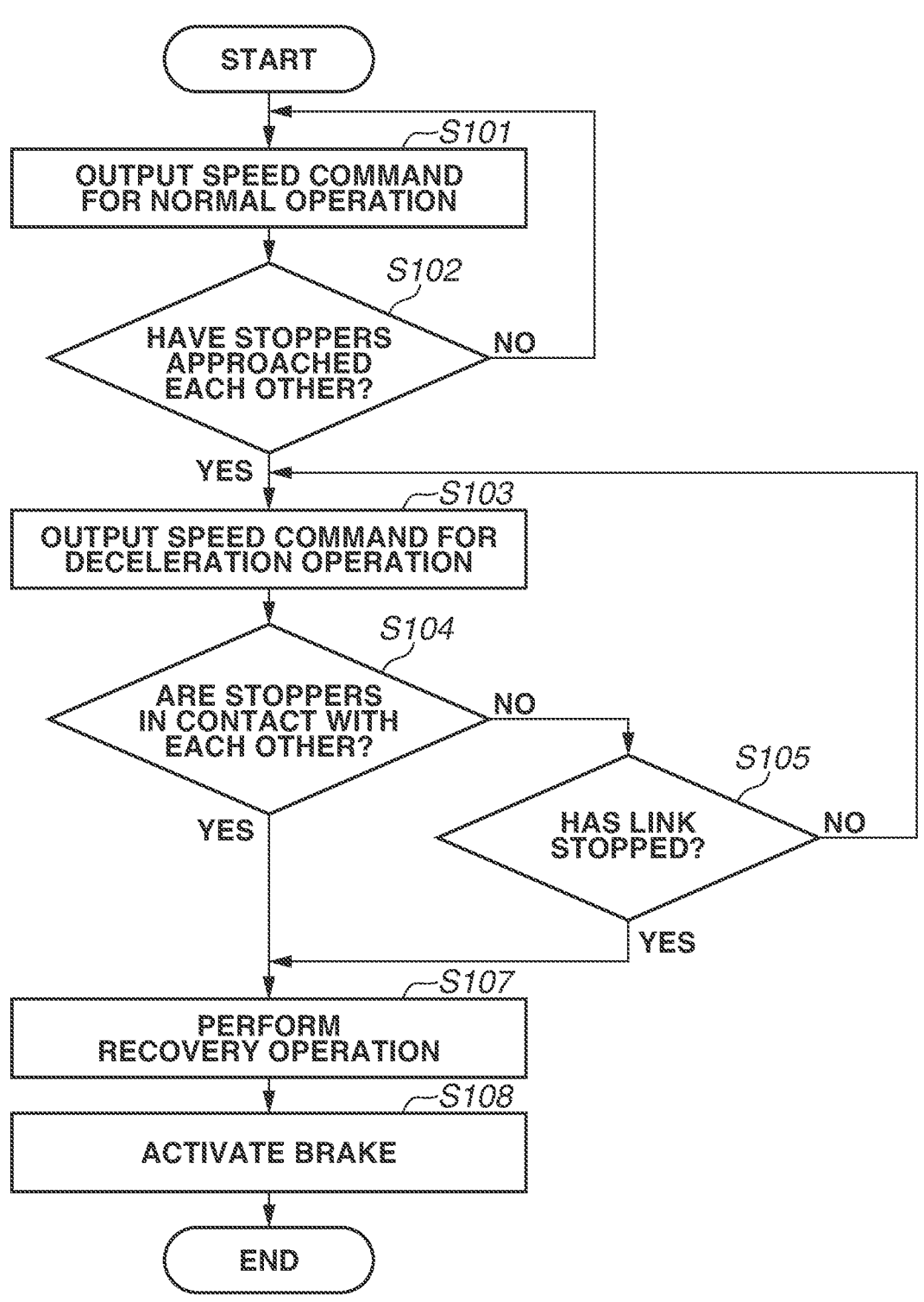
FIG. 15 is a control flowchart according to a sixth exemplary embodiment.

FIG. 15 is a flowchart of control processing according to the present exemplary embodiment. The control processing in the flowchart to be described below is executed by the control device 300 and the arm motor driver 230. The flowchart of control processing will be described assuming that control processing is executed when the stopper 251 and the stopper 252 are brought into contact with each other during a normal arm operation. Control processing for operating the link 201 is described as an example.

The sixth exemplary embodiment greatly differs from the fifth exemplary embodiment in that the recovery operation is performed in step S107 after detecting that the link 201 has stopped. In step S107, when the stopped state of the link 201 is detected, the recovery operation for positioning the link 201 at a recovery position (predetermined position) so that the robot arm body 200 has a predetermined recovery orientation. In this recovery operation, it is assumed that there is no risk that the robot arm body 200 is brought into contact with any peripheral object.

After completion of the recovery operation in step S107, then in step S108, the brake 261 is activated so that the link 201 can maintain the recovery orientation. Then, the flow of the control processing ends.

According to the present exemplary embodiment described above, in a state where the stoppers 251 and 252 are brought into contact with each other the link 201 has stopped using the torque sensor 221, the brake 261 is activated so that the link 201 maintains the recovery orientation state. Thus, the stopped state of the link 201 can be maintained not only by the stoppers 251 and 252, but also by the brake 261, which leads to a reduction in the possibility that the orientation of the robot arm cannot be maintained by the stoppers. Further, the approach state between the stoppers 251 and 252 is detected and the link 201 is decelerated, and the torque command value for compensating for the weight of the link 201 is output immediately after the contact state is detected. Accordingly, adverse effects of the operation of the link 201 and for the weight of the link 201 upon the torque sensor 221 can be reduced, and the possibility of breaking the torque sensor 221 can also be reduced. When the stopped state of the link 201 is detected, the recovery operation is executed without waiting for a user operation, which makes it possible to more rapidly perform the recovery operation. In a predetermined robot, the present exemplary embodiment and modified examples thereof can be carried out in combination with the above-described exemplary embodiments and modified examples thereof.

A seventh exemplary embodiment will now be described. While in the fifth and sixth exemplary embodiments described above, the descriptions are given of an example where the mechanical stopper is used to limit the movable range of the link 201 to less than 360°, the present disclosure is not limited to this example. For example, if the movable range of the link 201 is limited to 360° or more, it is effective to use a movable mechanical stopper. This configuration will be described in detail below. In the seventh exemplary embodiment, hardware modules and components of the control system that are different from those of the first and second exemplary embodiments are illustrated and described below. Components of the seventh exemplary embodiment that are similar to the components of the first and second exemplary embodiments have the same configuration and operation, and thus detailed descriptions thereof are omitted.

Figures 16A, 16B:
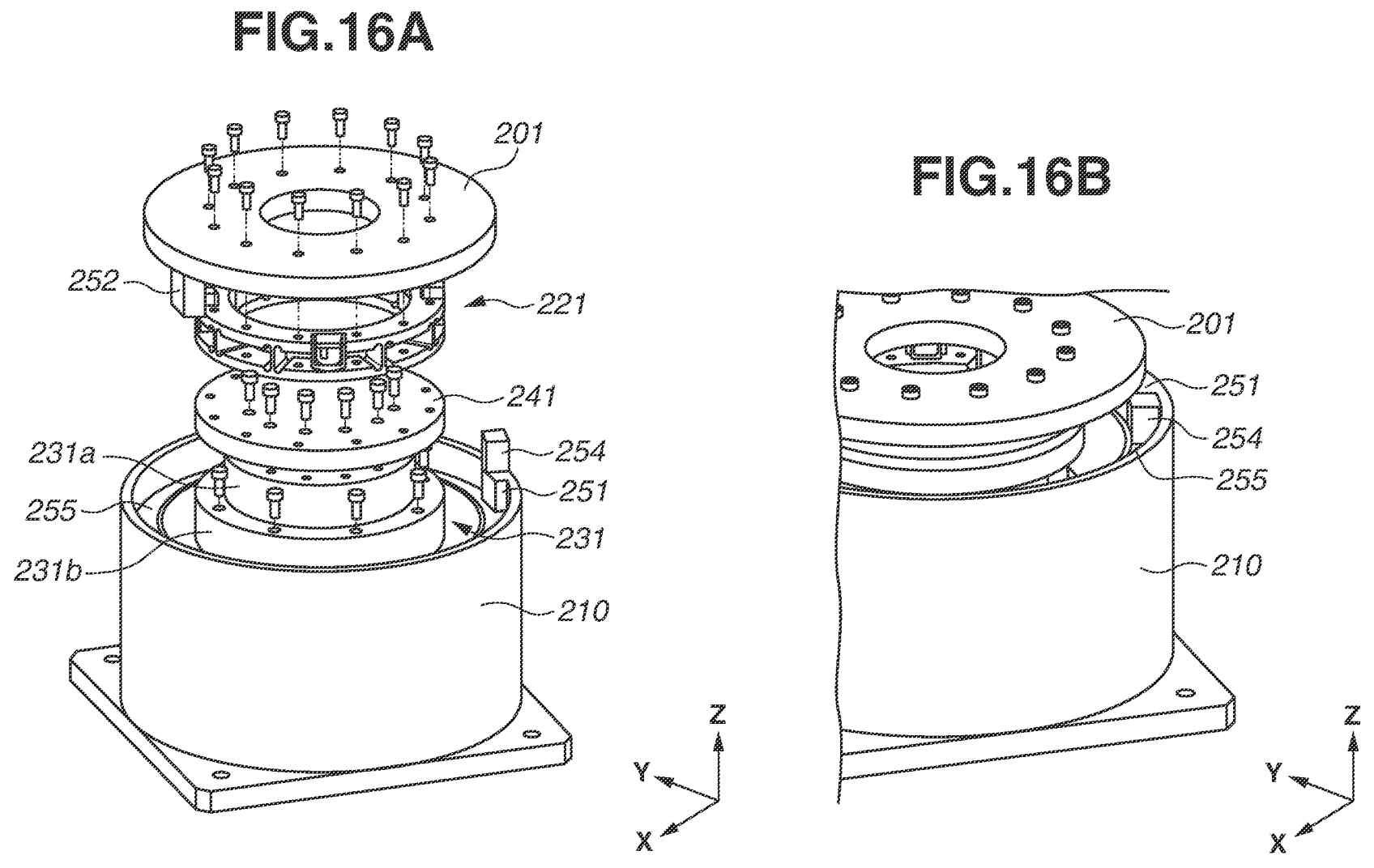

FIGS. 16A and 16B each illustrate a connection relationship between the base 210 and the link 201 of the robot arm body 200 according to the present exemplary embodiment. FIG. 16A is an exploded view, and FIG. 16B illustrates details of the stopper portion in the assembled state. As illustrated in FIG. 16A, the driving device 231 is fastened to the base 210 with bolts via the housing 231b, and the drive flange 241 is fastened to the output shaft 231a of the driving device 231 with bolts. The torque sensor 221 is fastened to the drive flange 241 with bolts, and the link 201 is fastened to the opposing surface of the torque sensor 221 with bolts.

As illustrated in FIG. 16A, the stopper 251 for mechanically limiting the movable range of the link 201 is provided on the inside of the base 210. FIG. 16A illustrates a state where the movable component 254 is detached from the slidable groove portion 255. As illustrated in FIG. 16B, the movable component 254 is located in the groove portion 255. The link 201 is provided with the stopper 252 within the size of the diameter from the center of the base 210 to the stopper 251 (to prevent the stopper 252 from being in contact with the stopper 251). When the link 201 is moved, the movable component 254 and the stopper 252 are brought into contact with each other and the movable component 254 slides along the groove portion 255, thereby allowing the movable component 254 to move with the link 201. The movable component 254 and the stopper 251 are brought into contact with each other, thereby limiting the movable range of the link 201.

FIGS. 17A to 17H each illustrate an operation of each stopper according to the present exemplary embodiment. In FIGS. 17A to 17H, the illustration of the link 201 and the torque sensor 221 is omitted to facilitate the illustration of the operation of each of the stopper 252 and the movable component 254. In practice, the link 201 is formed above each stopper and the stopper 252 is provided on the link 201 and is not provided on the drive flange 241 and moves with the link 201 in FIGS. 17A to 17H. A coordinate system is illustrated at a lower right position on the drawing sheet.

FIG. 17A illustrates an initial state of the stopper 252. In the initial state, the movable component 254 is located in the groove portion 255 and is in contact with the right side of the stopper 251. The stopper 252 of the link 201 is located at a position opposed to the stopper 251. As the link 201 and the stopper 252 are rotated clockwise as indicated by the arrow in FIG. 17B from the initial state, the stopper 252 and the movable component 254 are brought into contact with each other. Further, as the link 201 and the stopper 252 are rotated clockwise as indicated by the arrow in FIG. 17C, the movable component 254 and the stopper 252 move while being in contact with each other. Further, as the link 201 and the stopper 252 are rotated clockwise as indicated by the arrow in FIG. 17D, the movable component 254 is sandwiched between the stopper 251 and the stopper 252 and thus is not further rotated.

As the link 201 and the stopper 252 are rotated counterclockwise as indicated by the arrow in FIG. 17E from the state illustrated in FIG. 17D, the stopper 252 and the movable component 254 are brought into contact with each other as illustrated in FIG. 17F. Further, as the link 201 and the stopper 252 are rotated counterclockwise as indicated by the arrow in FIG. 17G, the movable component 254 and the stopper 252 move while being in contact with each other. Further, as the link 201 and the stopper 252 are rotated counterclockwise as indicated by the arrow in FIG. 17H, the movable component 254 is sandwiched between the stopper 251 and the stopper 252 and thus is not further rotated. The above-described configuration makes it possible to mechanically limit the operating range even when the link 201 can be rotated by 360° or more.

In the present exemplary embodiment, a threshold for stopper approach determination in step S102 is set based on a detected value of the encoder 211 in a state where the movable component 254 is sandwiched between the stopper 251 and the stopper 252. Also, in the present exemplary embodiment, a threshold for a state where the movable component 254 is sandwiched between the stopper 251 and the stopper 252 in clockwise rotation and a threshold for a state where the movable component 254 is sandwiched between the stopper 251 and the stopper 252 in counterclockwise rotation are set.

The threshold for stopper contact determination in step S104 is set based on the detected value of the torque sensor 221 in the state where the movable component 254 is sandwiched between the stopper 251 and the stopper 252. Also, in the present exemplary embodiment, a mean value of forces generated by bringing the stopper 251 and the stopper 252 into contact with each other several times may be set as the threshold for contact determination. The detected value of the torque sensor 221 when the stopper 252 and the movable component 254 are brought into contact with each other and the detected value of the torque sensor 221 when the movable component 254 slides along the groove portion 255 may be stored in the control device 300. This configuration makes it possible to accurately determine the contact state between the movable component 254 and the stopper 251 and the contact state between the movable component 254 and the stopper 252.

According to the present exemplary embodiment described above, in a state where the stoppers 251 and 252 are brought into contact with each other and the link 201 has stopped using the torque sensor 221, the torque command for compensating for the weight of the link 201 is output, or a predetermined orientation state of the link 201 is maintained by the brake 261. Thus, the predetermined orientation state of the link 201 can be maintained not only by the stoppers 251 and 252, but also by the driving device 231 and the brake 261, which leads to a reduction in the possibility that the orientation of the robot arm cannot be maintained by the stoppers. The approach state between the stoppers 251 and 252 is detected and the link 201 is decelerated, and the torque command value for compensating for the weight of the link 201 is output immediately after the contact state is detected. Accordingly, adverse effects of the operation of the link 201 and the weight of the link 201 upon the torque sensor 221 can be reduced, and the possibility of breaking the torque sensor 221 can also be reduced.

The present exemplary embodiment can be carried out also when a movable mechanical stopper is used. In a predetermined robot, the present exemplary embodiment and modified examples thereof can be carried out in combination with the above-described exemplary embodiments and modified examples thereof.

An eighth exemplary embodiment will now be described. The above-described fifth, six, and seventh exemplary embodiments are described using an example where the threshold for approach determination and the threshold for contact determination are set in advance. However, for example, in the mechanical stopper of the type that can vary the contact position between stoppers, it is effective to edit the thresholds (control parameters) for determination.

This configuration will be described in detail below. In the eighth exemplary embodiment, hardware modules and components of the control system that are different from those of the fifth, sixth, and seventh exemplary embodiments are illustrated and described below. Components of the eighth exemplary embodiment that are similar to the components of the fifth, sixth, and seventh exemplary embodiments have the same configuration and operation, and thus detailed descriptions thereof are omitted.

Figure 18:
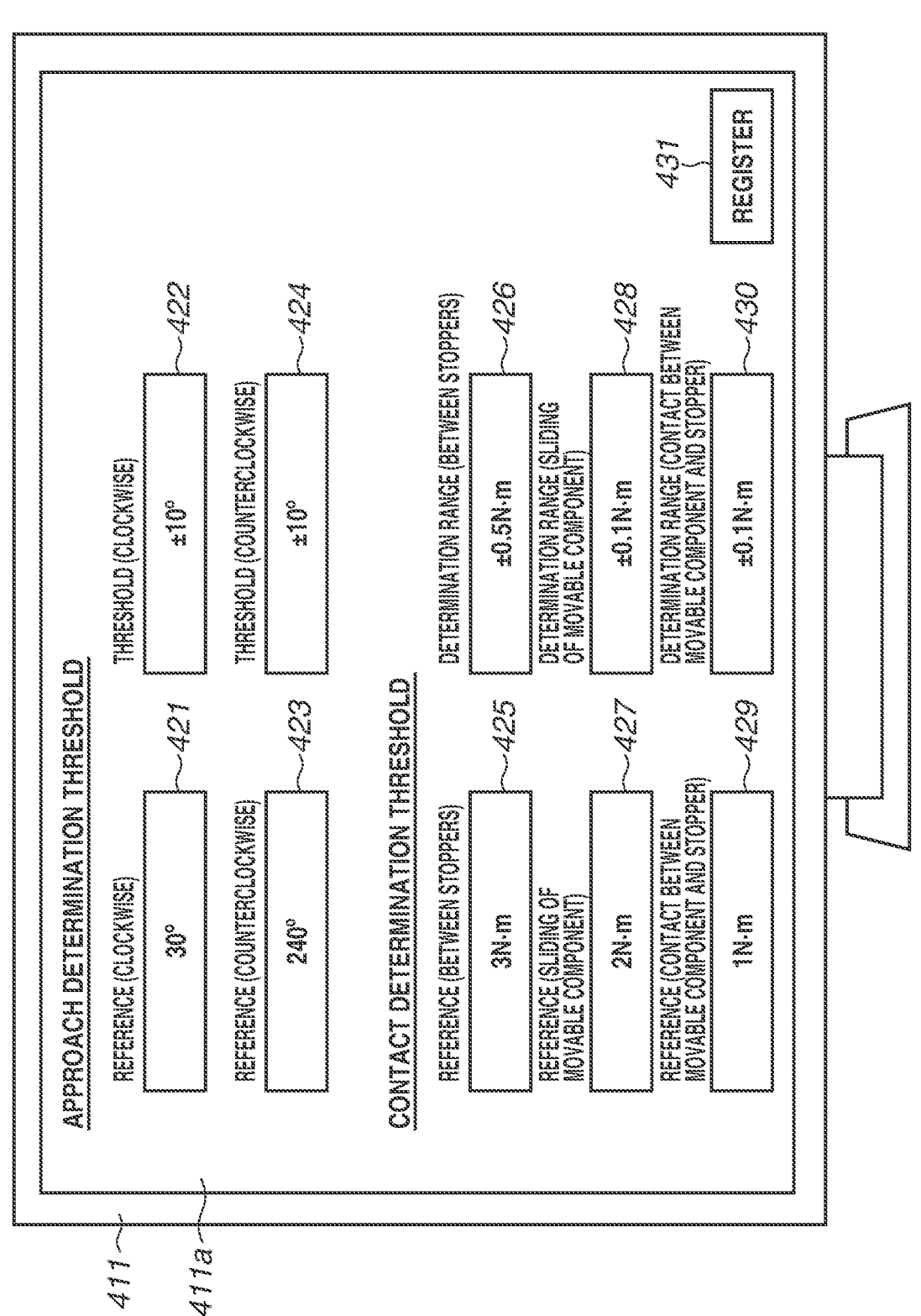
FIG. 18 illustrates a setting screen displayed on a display unit of a monitor according to an eighth exemplary embodiment.

FIG. 18 illustrates a threshold setting screen on a display unit 411a of the monitor 411 according to the present exemplary embodiment. Boxes 421, 422, 423, and 424 are boxes for setting a threshold for approach determination. Boxes 425, 426, 427, 428, 429, and 430 are boxes for setting a threshold for contact determination. The display of these boxes is controlled by the CPU 301 of the control device 300.

The box 421 is a box for inputting a value when the link 201 is operated clockwise and the stopper 251 and the stopper 252 are brought into contact with each other. In FIG. 18, a rotation angle of 30° is input and is set as a reference value for the threshold for approach determination. The box 422 is a box for inputting a threshold range for approach determination based on the reference value input in the box 421. In FIG. 18, ±10° is input and the approach determination is made within the range of 30°±10°.

The box 423 is a box for inputting a value when the link 201 is operated counterclockwise and the stopper 251 and the stopper 252 are brought into contact with each other. In FIG. 18, a rotation angle of 240° is input and is set as the reference value for the threshold for approach determination. The box 424 is a box for inputting a threshold range for approach determination based on the reference value input in the box 423. In FIG. 18, ±10° is input and the approach determination is made within the range of 240°±10°.

The box 425 is a box for inputting a threshold for determination of the contact state between stoppers. In FIG. 18, 3 Nm is input as a torque value. The box 426 is a box for inputting a threshold range for contact determination based on the torque value input in the box 425. In FIG. 18, ±0.5 Nm is input, and if the detected value in the range of 3±0.5 Nm is acquired, it is determined that the stoppers are in contact with each other. The values in the boxes 425 and 426 may be used for determination of a state where the movable component 254 is sandwiched between the stopper 251 and the stopper 252.

The box 427 is a box for inputting a threshold for determining sliding of the movable component 254. In FIG. 18, 2·Nm is input as a torque value. The box 428 is a box for inputting a threshold range for sliding determination based on the torque value input in the box 427. In FIG. 18, ±0.1 Nm is input, and if the detected value in the range of 2±0.1 Nm is acquired, it is determined that the movable component 254 is sliding.

The box 429 is a box for inputting a threshold for determination of the contact state between the movable component 254 and the stopper 252. In FIG. 18, 1 Nm is input as a torque value. The box 430 is a box for inputting a threshold range for determination of the contact state between the movable component 254 and the stopper 252 based on the torque value input in the box 429. In FIG. 18, ±0.1 Nm is input, and if the detected value in the range of 1±0.1 Nm is acquired, it is determined that the movable component 254 and the stopper 252 are in contact with each other. The thresholds can be registered by pressing a register button 431 after all the thresholds are set.

According to the present exemplary embodiment described above, in the mechanical stopper of the type that can vary the contact position between stoppers, thresholds for determining the approach or contact state between stoppers can be edited. This facilitates the determination of the approach or contact state between stoppers even when the stopper position is changed. Further, even when the detected value from each torque sensor is changed, the thresholds for determination can be easily adjusted. In a predetermined robot, the present exemplary embodiment and modified examples thereof can be carried out in combination with the above-described exemplary embodiments and modified examples thereof.

Other Exemplary Embodiments

Specifically, the processing procedures according to the exemplary embodiments described above are executed by the CPU 301 of the control device 300. Accordingly, the processing procedures can be executed by reading out and executing software programs that can execute the above-described functions from a storage medium storing the software programs. In this case, the programs read out from the storage medium implement the functions according to the exemplary embodiments described above, and the programs and the storage medium storing the programs constitute the present disclosure.

In the exemplary embodiments described above, the descriptions are given of a case where each ROM, each RAM, or each flash-ROM is used as a computer-readable storage medium and programs are stored in a ROM, a RAM, or a flash-ROM. However, the present disclosure is not limited to this configuration. A program for carrying out the present disclosure may be recorded any storage medium as long as the storage medium is a computer-readable storage medium. Examples of a storage medium used for supplying control programs include an HDD, an external storage device, and a recording disk.

While various exemplary embodiments are described above based on an example where the robot arm body 200 uses an articulated robot arm including a plurality of joints, the number of joints is not limited to the in this example. While a vertical multi-axial configuration is described as a form of a robot arm in the above-described exemplary embodiments, the above-described configurations can also be implemented in different forms of joints, such as a horizontal articulated form, a parallel link form, and an orthogonal robot. Examples of a drive source for driving each joint may include a device such as an artificial muscle. The present disclosure can also be applied to a prosthetic hand and a prosthetic limb including a sensor for detecting a force, such as a torque sensor, and a powered suit (power assist suit).

The various exemplary embodiments described above can also be applied to machines configured to automatically perform an expansion/contraction operation, a bending/stretching operation, an up-down movement, a right-left movement, or a turning operation, or combined operations thereof based on information stored in a storage device provided in a control device.

The torque sensors 221 to 226 described in the various exemplary embodiments described above use an optical encoder to detect a relative movement amount between the first fixing member 511 and the second fixing member 512, but instead may employ another configuration. For example, to magnetically measure a displacement, a magnetic flux generation source and a magnetoelectric transducer may be located in one of the first fixing member 511 and the second fixing member 512 to detect the displacement. When the first fixing member 511 and the second fixing member 512 move relative to each other, the magnitude of the density of a magnetic flux flowing into the magnetoelectric transducer changes with a change in the distance between the magnetic flux generation source and the magnetoelectric transducer, so that the output from the magnetoelectric transducer changes along with the change in the density of the magnetic flux. The displacement can be measured by detecting the change in the output from the magnetoelectric transducer.

The present disclosure is not limited to the above-described exemplary embodiments. Various modifications can be made within the technical idea of the present disclosure. Advantageous effects described in the exemplary embodiments of the present disclosure are merely examples of effects produced by the present disclosure. The advantageous effects of the present disclosure are not limited to those described in the exemplary embodiments of the present disclosure.

According to an aspect of the present disclosure, it is possible to reduce the risk of damaging a sensor for detecting a force when a robot is stopped by a mechanical stopper.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2021-177909, filed Oct. 29, 2021, and No. 2021-198021, filed Dec. 6, 2021, which are hereby incorporated by reference herein in their entirety.

What is claimed is:

1. A robot comprising,
a first link having a first face and a second face;
a driving device configured to cause the first link to rotate about an axis substantially perpendicular to the first face and the second face;
a transmission member configured to transmit a rotation of the driving device, the transmission member having a third face substantially parallel to the second face of the first link;
a torque sensor provided between the third face of the transmission member and the second face of the first link;
a first stopper extending from the second face of the first link; and
a second stopper provided on the transmission member,
wherein the first stopper and the second stopper are brought into contact with each other by a relative movement between the first link and the transmission member.

2. The robot according to claim 1, wherein the second stopper is provided with a space in which the first stopper is placed, and the first stopper is placed in the space with a predetermined clearance, and
wherein rotation by the transmission member of the driving device moves the first stopper around at least a portion of a circumference of the driving device.

3. The robot according to claim 2, wherein the space is an opening configured to surround an entire periphery of the first stopper.

4. The robot according to claim 2, wherein;
the first stopper is provided with a boss, and
with the first stopper placed in the space, the boss is positioned on a side of the opening opposite to the first link.

5. The robot according to claim 1, wherein the first stopper is provided with a space in which the second stopper is placed, and the second stopper is placed in the space with a predetermined clearance.

6. The robot according to claim 5, wherein the space is a void.

7. The robot according to claim 1, wherein one of the first stopper and the second stopper is detachably mounted.

8. The robot according to claim 7, wherein one of the first stopper and the second stopper is positionally adjustable.

9. The robot according to claim 7, wherein one of the first link and the transmission member is provided with a mounting portion to mount one of the first stopper and the second stopper.

10. The robot according to claim 9, wherein one of the first link and the transmission member is provided with a plurality of mounting portions.

11. The robot according to claim 7, wherein one of the first stopper and the second stopper is detachably mounted with a bolt.

12. The robot according to claim 7, wherein one of the first stopper and the second stopper is positioned with a pin.

13. The robot according to claim 1,
wherein the torque sensor is divided into at least two parts, and
wherein the second stopper is provided between the parts.

14. The robot according to claim 13, wherein the second stopper is provided with a groove portion in which the first stopper is placed with a predetermined clearance.

15. The robot according to claim 1, further comprising a second link on which the driving device is provided,
wherein the second link is provided with a third stopper to be brought into contact with one of the first stopper and the second stopper by a relative movement between the first link and the second link.

16. The robot according to claim 15, wherein when one of the first stopper and the second stopper is brought into contact with the third stopper with a predetermined force, the first stopper and the second stopper are brought into contact with each other.

17. The robot according to claim 16, wherein in a case where the first link and the transmission member are rotated in a state where a force smaller than the predetermined force acts on each of the first link and the transmission member, the first stopper and the second stopper are not brought into contact with each other.

18. The robot according to claim 15,
wherein the second link is provided with a sliding portion, and
wherein the second link includes a member configured to slide along the sliding portion, move with the first link in a state where the member is in contact with one of the first stopper and the second stopper, and to be brought into contact with the third stopper.

19. The robot according to claim 18, wherein the member is a movable component.

20. The robot according to claim 1,
wherein the driving device includes a motor and a decelerator configured to decelerate a rotation of the motor, and
wherein the transmission member is connected to an output shaft of the decelerator.

21. A method for manufacturing an article using the robot according to claim 1.

22. A control method for the robot according to claim 1, comprising controlling the driving device using a control device.

23. A non-transitory computer-readable storage medium storing a control program for causing a computer to execute the control method according to claim 22.

* * * * *